(12) United States Patent
Kawaguchi et al.

(10) Patent No.: US 9,646,381 B2
(45) Date of Patent: May 9, 2017

(54) STATE-OF-POSTURE ESTIMATION DEVICE AND STATE-OF-POSTURE ESTIMATION METHOD

(75) Inventors: Kyoko Kawaguchi, Tokyo (JP); Masamoto Tanabiki, Kanagawa (JP); Kensuke Maruya, Osaka (JP); Yuji Sato, Tokyo (JP); Mitsuko Fujita, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 545 days.

(21) Appl. No.: 13/820,206

(22) PCT Filed: Jan. 10, 2012

(86) PCT No.: PCT/JP2012/000090
§ 371 (c)(1),
(2), (4) Date: Jun. 7, 2013

(87) PCT Pub. No.: WO2012/101962
PCT Pub. Date: Aug. 2, 2012

(65) Prior Publication Data
US 2013/0259391 A1 Oct. 3, 2013

(30) Foreign Application Priority Data
Jan. 24, 2011 (JP) ................. 2011-011860

(51) Int. Cl.
*G06K 9/62* (2006.01)
*G06T 7/00* (2017.01)
*G06T 7/73* (2017.01)

(52) U.S. Cl.
CPC .............. *G06T 7/0044* (2013.01); *G06T 7/73* (2017.01); *G06T 7/75* (2017.01);
(Continued)

(58) Field of Classification Search
None
See application file for complete search history.

(56) References Cited

U.S. PATENT DOCUMENTS

| 2009/0080780 | A1 | 3/2009 | Ikeda | |
|---|---|---|---|---|
| 2009/0252423 | A1* | 10/2009 | Zhu | G06K 9/00201 382/209 |
| 2011/0080475 | A1* | 4/2011 | Lee | G06F 3/017 348/77 |

FOREIGN PATENT DOCUMENTS

| JP | 2005-165923 A | 6/2005 |
|---|---|---|
| JP | 2010-211705 A | 9/2010 |
| WO | 2007/010893 A1 | 1/2007 |

OTHER PUBLICATIONS

Masamichi Shimosaka, Makoto Sato, Taketoshi Mori, and Tomomasa Sato, "Motion Recognition Using Shape Features in Monocular Images," in the collection of presentation papers from the 70th National Convention in 2008 (5), Information Processing Society of Japan, Mar. 13, 2008, p. 5-93, p. 5-94.
(Continued)

*Primary Examiner* — Fred Hu
(74) *Attorney, Agent, or Firm* — Pearne & Gordon, LLP

(57) ABSTRACT

This posture state estimation device is capable of estimating with high accuracy the posture state of an object. The posture state estimation device (100) is a device for estimating the posture state of an object having a plurality of sections connected by joints on the basis of image data that images the object, and has a section candidate extraction unit (140) for extracting a section candidate for a section from the image data, a complementary section candidate extraction unit (160) which estimates that a portion of an unextracted section for which a section candidate has not been extracted is being shadowed by an already extracted section for which a section candidate has been extracted in order to
(Continued)

extract a section candidate of the unextracted section, and a posture state estimation unit (170) for estimating the posture state of the object on the basis of the extracted section candidate.

13 Claims, 19 Drawing Sheets

(52) U.S. Cl.
CPC .............. *G06T 2207/10016* (2013.01); *G06T 2207/10024* (2013.01); *G06T 2207/20076* (2013.01); *G06T 2207/30196* (2013.01)

(56) References Cited

OTHER PUBLICATIONS

P. Viola and M. Jones, "Rapid Object Detection Using a Boosted Cascade of Simple Features," in Proc. of CVPR, vol. 1, Dec. 2001, pp. 511-518.

Tomoki Murakami et al., "Jiko Occlusion o Fukumu Jinbutsu Shisei no Kyori Gazo ni yoru Suitei", Dai 65 Kai (Heisei 15 Nen) Zenkoku Taikai Koen Ronbunshu (2), Jinko Chino to Ninchi Kagaku, Mar. 25, 2003 (Mar. 25, 2003), 2-361 to 2-362.

International Search Report for PCT/JP2012/000090 dated Apr. 17, 2012.

\* cited by examiner

| IDENTIFIER | PROJECTION ANGLE | COORDINATES OF LEFT SHOULDER POSITION | COORDINATES OF GEOMETRIC CENTER POSITION OF HEAD | ORIENTATION OF REFERENCE PART (DEGREES) |
|---|---|---|---|---|
| 1 | 45 | 1, 0 | $0.5, \dfrac{1}{2\sqrt{3}}$ | 0, 0, 0 |
| 2 | 45 | $\dfrac{1}{\sqrt{2}}, -\dfrac{1}{\sqrt{2}}$ | 0.3, 1.2 | 0, 45, 0 |
| ... | ... | ... | ... | ... |

FIG. 10

| IDENTIFIER | PROJECTION ANGLE | HEAD-SHOULDER REGION POSITION (RIGHT SHOULDER POSITION IN IMAGE) | HEAD-SHOULDER REGION ORIENTATION (ANGLE) | RIGHT UPPER ARM (CENTER COORDINATES AND RADIUS) | LEFT UPPER ARM (CENTER COORDINATES AND RADIUS) | ... |
|---|---|---|---|---|---|---|
| 1 | 45 | 300, 250 | 0, 0, 0 | 300, 250, 100 | 350, 250, 100 | ... |
| 2 | 45 | 300, 250 | 0, 45, 0 | ... | ... | ... |
| ... | ... | ... | ... | ... | ... | ... |

FIG. 11

STATE-OF-POSTURE ESTIMATION DEVICE AND STATE-OF-POSTURE ESTIMATION METHOD

TECHNICAL FIELD

The claimed invention relates to a posture state estimation apparatus and posture state estimation method that estimate the posture state of an object based on image data capturing the object, the object having a plurality of parts articulated by joints.

BACKGROUND ART

Human posture estimation based on image data from a captured video sequence has been an active area of research in recent years. This is because being able to determine human behavior based on videos through computer analysis would make behavior analysis, which is performed in various fields, possible without requiring human effort. Examples of behavior analysis include abnormal behavior detection on the streets, purchasing behavior analysis in stores, factory streamlining support, and form coaching in sports.

In this respect, PL 1, for example, discloses a technique for estimating the posture state of a person based on image data captured with a monocular camera. In the technique disclosed in PL 1 (hereinafter referred to as "related art technique"), part candidates are first extracted based on elliptical shapes or parallel lines contained in the captured image. Next, the related art technique uses a likelihood function, which is statistically derived from a plurality of sample images, to compute part likelihoods and part relation likelihoods. The related art technique then computes the optimal combination of part candidates based on these likelihoods. The use of the above-mentioned related art technique enables identification as to which part is located at which region, as well as estimation of the posture state of a human regardless of location or orientation.

CITATION LIST

Patent Literature

PL 1
Japanese Patent Application Laid-Open No. 2005-165923

Non-Patent Literature

NPL 1
Masamichi Shimosaka, Makoto Sato, Taketoshi Mori, and Tomomasa Sato, "Motion Recognition Using Shape Features in Monocular Images," in the collection of presentation papers from the 70$^{th}$ National Convention in 2008 (5), Information Processing Society of Japan, Mar. 13, 2008, p. 5-93, p. 5-94

NPL 2
P. Viola and M. Jones, "Rapid Object Detection Using a Boosted Cascade of Simple Features," in Proc. of CVPR, vol. 1, December, 2001, ppp. 511-518

SUMMARY OF INVENTION

Technical Problem

However, the related art technique has a problem in that certain posture states cannot be estimated accurately. This is because when there is a part that is occluded by another part, the shape in the image may not be elliptical, or one of two edges may not be obtained, and so forth, thereby barring extraction of a part candidate for that part. By way of example, assuming that the right upper arm of a person facing left is occluded by the left upper arm which is located in front, in this case, the related art technique would be unable to extract a part candidate for the right upper arm. Consequently, for example, it would be unable to distinguish between a posture state where the right upper arm is occluded by the left upper arm, and a posture state where the right upper arm is occluded by the torso.

Furthermore, while the related art technique could be applied to various objects, besides humans, having a plurality of parts articulated by joints (e.g., robots), similar problems could still arise in such cases.

An object of the claimed invention is to provide a posture state estimation apparatus and posture state estimation method capable of accurately estimating the posture state of an object having joints.

Solution to Problem

A posture state estimation apparatus of the claimed invention includes a posture state estimation apparatus that estimates a posture state of an object having a plurality of parts articulated by joints based on image data that images the object, the posture state estimation apparatus including: a part candidate extraction section that extracts a part candidate for the parts from the image data; a complement part candidate extraction section that infers that an unextracted part for which the part candidate has not been extracted by the part candidate extraction section is partially occluded by an extracted part for which the part candidate has been extracted by the part candidate extraction section, and extracts a part candidate for the unextracted part from the image data; and a posture state estimation section that estimates the posture state of the object based on the extracted part candidates.

A posture state estimation method of the claimed invention includes a posture state estimation method that estimates a posture state of an object having a plurality of parts articulated by joints based on image data that images the object, the posture state estimation method including: extracting a part candidate for the parts from the image data; inferring that an unextracted part for which the part candidate has not been extracted is partially occluded by an extracted part for which the part candidate has been extracted, and extracting a part candidate for the unextracted part from the image data; and estimating the posture state of the object based on the extracted part candidates.

Advantageous Effects of Invention

With the claimed invention, the posture state of an object having joints may be estimated accurately.

BRIEF DESCRIPTION OF DRAWINGS

FIG. 10 is a diagram showing example contents of a reference part correspondence table with respect to the present embodiments;

FIG. 11 is a diagram showing example contents of a part region correspondence table with respect to the present embodiments;

DESCRIPTION OF EMBODIMENTS

Figure 1:
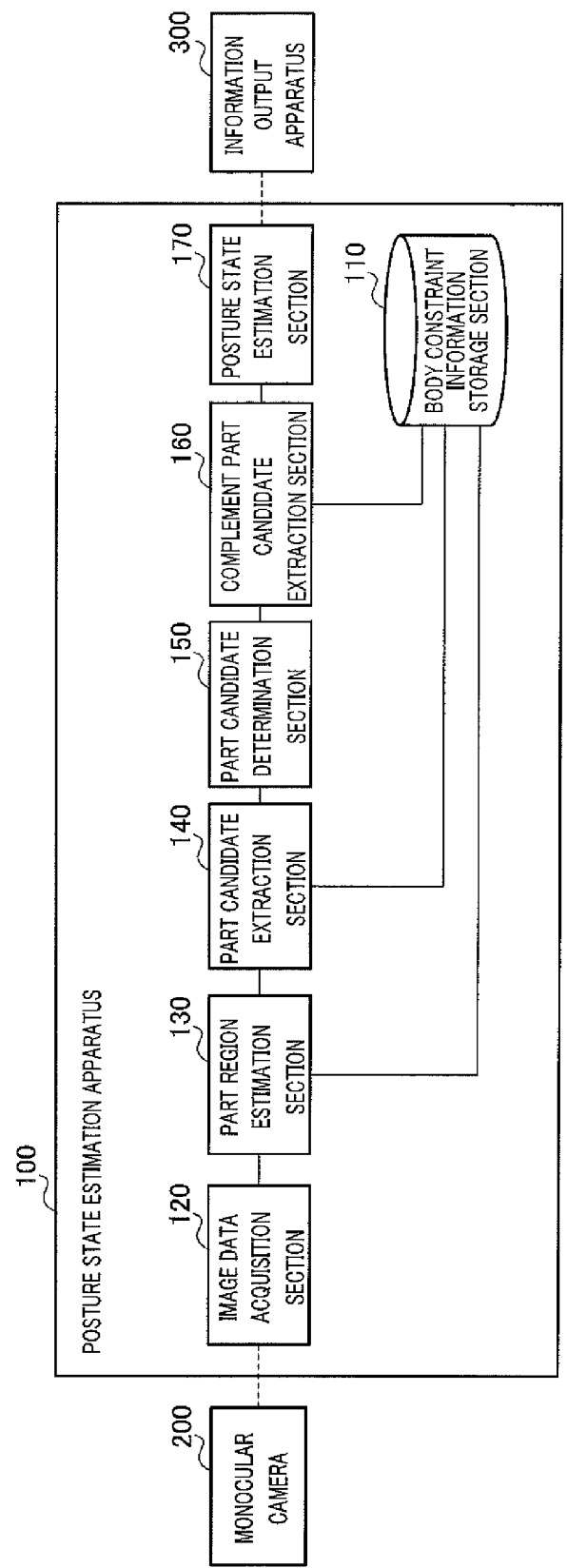
FIG. 1 is a block diagram showing configuration example of a posture state estimation apparatus according to an embodiment of the claimed invention.

An embodiment of the claimed invention is described in detail below with reference to the drawings.

In the description below, the term "part" refers to one unit among portions of the human anatomy divided by joints. In other words, the term part may refer to, for example, the head, the shoulders, the right upper arm, the right forearm, the left upper arm, the left forearm, the right thigh, the right crus, the left thigh, or the left crus. Further, the term "part region" refers to a region that could be occupied by a given part within an image, i.e., the range of motion of a part.

In addition, the term "part axis" refers to an imaginary center axis that runs through the length of a given part. Specifically, the term part axis refers to a line segment that connects a first joint, which articulates a given part with a first other part on the reference part side, and a second joint, or the end portion of the given part, that articulates the given part with a second other part. A part axis may be defined through a combination of coordinate information for the first joint, angle information, and part length, for example. It may also be defined through coordinate information for the first joint and coordinate information for the second joint or the end portion of the given part. By way of example, the position, orientation, and length of the part axis of the right upper arm generally coincide with the position, orientation, and length of the center axis of the bone of the right upper arm.

The to "part thickness" refers to the thickness of a part around the part axis.

The term "part candidate" refers to a candidate for the position of a part, which is the position of the part as estimated from image data.

The term "posture state" refers to the type of combination of postures (positions and/or angles) of two or more parts of interest, examples of which may include "right arm is bent," "upright standing state," and the like. "Posture" in this context may be represented by such information as the position of a joint articulating parts in a two-dimensional coordinate system or three-dimensional coordinate system, the lengths of the parts concerned, the angle formed between parts, and the like. Accordingly, the term "posture state estimation" involves estimating a posture state by estimating such information. The positions, lengths, and angles mentioned above may be expressed through relative values that reference a predetermined human body part, or through absolute values in a two-dimensional coordinate system or three-dimensional coordinate system.

Although descriptions are provided using pixels as basic units for the present embodiments, posture state estimation apparatus 100 may also perform similar processes by treating a group of pixels of a predetermined size as one pixel. This would enable a posture state estimation apparatus to carry out high-speed processing. When treating a plurality of pixels as one pixel, the value of the pixel that is the geometric center of the plurality of pixels may be used as the value of those plurality of pixels, or the average value of the values of the plurality of pixels may be used as the value of those plurality of pixels.

FIG. 1 is a block diagram showing the configuration of a posture state estimation apparatus according to an embodiment of the claimed invention. For purposes of convenience, peripheral devices of the posture state estimation apparatus are also shown in the drawing.

With respect to FIG. 1, posture state estimation apparatus 100 includes body constraint information storage section 110, image data acquisition section 120, part region estimation section 130, part candidate extraction section 140, part candidate determination section 150, complement part candidate extraction section 160, and posture state estimation section 170.

Body constraint information storage section 110 pre-stores constraint conditions regarding human anatomy and posture (hereinafter referred to as "body constraint information"). Body constraint information is information that is used for part region estimation and part candidate extraction, which are hereinafter discussed. The specifics of body constraint information vary depending on the part region estimation method and part candidate extraction method, and as such will be discussed later.

Image data acquisition section 120 obtains, by wire or wirelessly, image data of an image taken with monocular camera 200 installed in a predetermined three-dimensional coordinate space, and outputs it to part region estimation section 130. For the present embodiment, it is assumed that monocular camera 200 is a video camera. Image data acquisition section 120 receives video data captured continuously in real time by monocular camera 200 as input, and sequentially outputs to part region estimation section 130 still image data that form the video data. In the following description, it is assumed that the image data contains images of one person only. However, this is by no means limiting, and it may contain images of a plurality of people, or of none at all.

Figure 2:
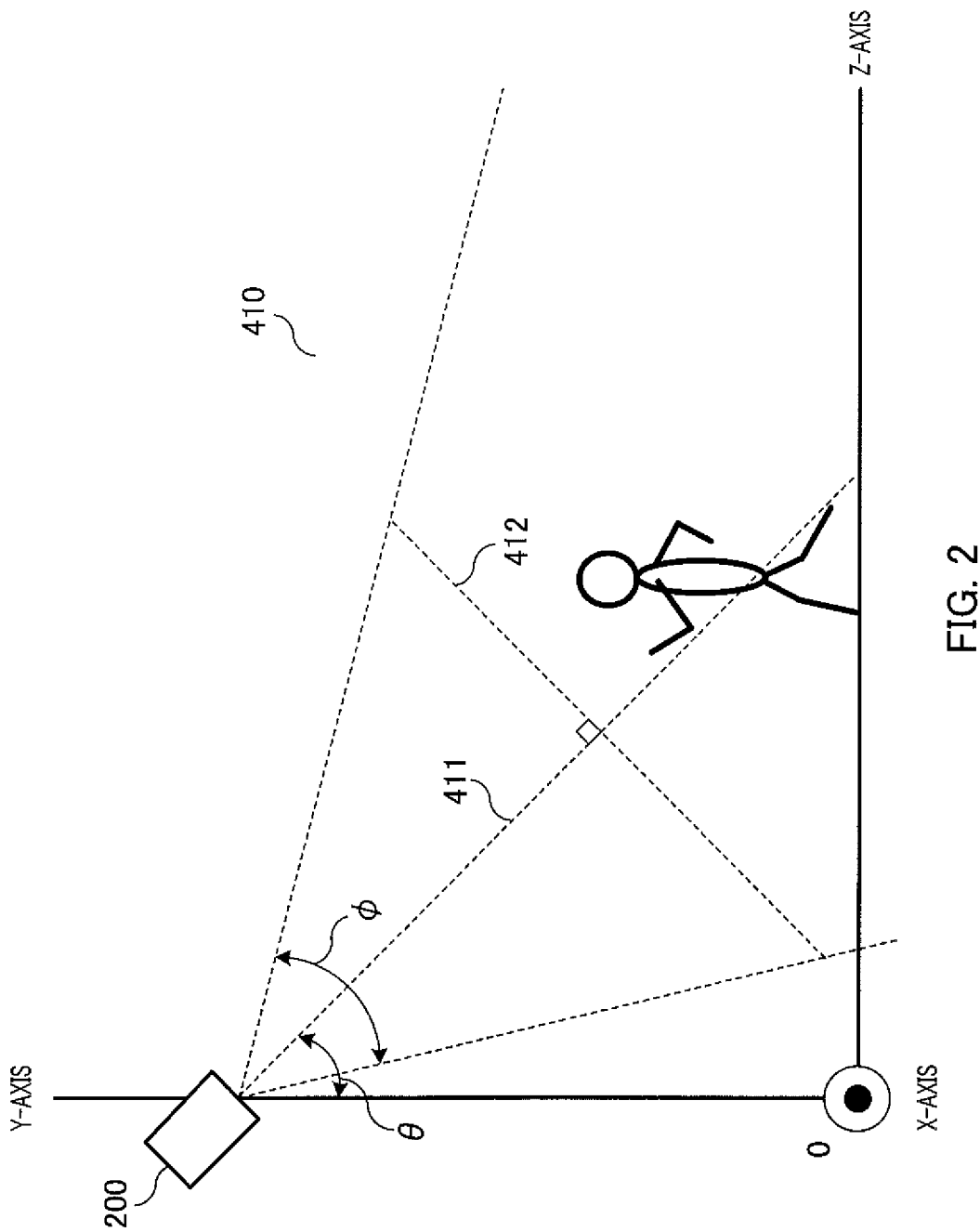
FIG. 2 is a diagram illustrating image data with respect to the present embodiments.

FIG. 2 is a diagram illustrating image data.

Three-dimensional coordinate system 410 is set up as shown in FIG. 2, where the position of monocular camera 200 as projected onto the ground is taken to be origin O, for example. Coordinate system 410 takes the perpendicular direction to be the Y-axis, a direction orthogonal to the Y-axis and optical axis 411 of monocular camera 200 to be the X-axis, and a direction orthogonal to the X-axis and the Y-axis to be the Z-axis, for example.

The installation angle of monocular camera 200 is denoted by angle θ formed between the Y-axis and optical axis 411, for example. Monocular camera 200 performs imaging by focusing on plane 412 contained in the range within view angle φ of monocular camera 200. Image data of the image thus captured is sent to posture state estimation apparatus 100.

Based on image data received from image data acquisition section 120, part region estimation section 130 in FIG. 1 estimates the part regions of various parts. Specifically, based on the image data, part region estimation section 130 estimates the positions and orientation of reference parts of a person. The "reference parts" are parts for which position and orientation estimation is performed before any other part, and whose estimation result bears on the position and orientation estimations of other parts. They preferably are parts that allow stable image acquisition in the image acquisition space. With the estimated positions and orientation of the reference parts as references, part region estimation section 130 estimates the part regions of various parts.

For the present embodiment, it is assumed that the reference parts include the head and shoulders of a person. It is assumed that the orientation of the reference parts is the orientation of the shoulders, where the orientation of the shoulders is defined as the direction of a straight line connecting the right shoulder and the left shoulder. Part region estimation section 130 outputs to part candidate extraction section 140 the image data and information indicating the part region of each part (hereinafter referred to as "part region data"). In the present embodiment, an image is obtained from above as shown in FIG. 2. Accordingly, taking the head and shoulders of a person to be the reference parts enables the most stable estimation.

Based on the received image data and the received part region data, part candidate extraction section 140 extracts part candidates. Part candidate extraction section 140 outputs to part candidate determination section 150 the image data and information indicating the extracted part candidates (hereinafter referred to as "part candidate information"). For the present embodiment, it is assumed that a part candidate is expressed in terms of a position in an image, that is, in terms of a two-dimensional coordinate system for the image.

It is assumed that the part candidate information is a likelihood map indicating a distribution of likelihoods regarding the position of each part.

Specifically, in the present embodiment, part candidate extraction section 140 generates a likelihood map where, for regions other than the part regions indicated by the part region data received from part region estimation section 130, the likelihood that designated parts corresponding to those part regions are located thereat is set low. A likelihood map generated based on image data is hereinafter referred to as an "estimated likelihood map."

Part candidate determination section 150 determines, of the parts to be used for posture state estimation, which parts are extracted parts, and which parts are unextracted parts. An "extracted part" is a part for which a part candidate has been extracted by part candidate extraction section 140. An "unextracted part," on the other hand, is a part for which no part candidate has been extracted by part candidate extraction section 140. Along with the image data and part candidate information, part candidate determination section 150 outputs to complement part candidate extraction section 160 extracted part identifiers indicating the extracted parts and unextracted part identifiers indicating the unextracted parts.

Complement part candidate extraction section 160 infers that the unextracted parts are partially occluded by the extracted parts, and extracts part candidates for the unextracted parts from the image data. Complement part candidate extraction section 160 reflects the extraction result in the part candidate information (estimated likelihood map) to complement the part candidate information, and outputs the complemented part candidate information to posture state estimation section 170.

Figure 3:
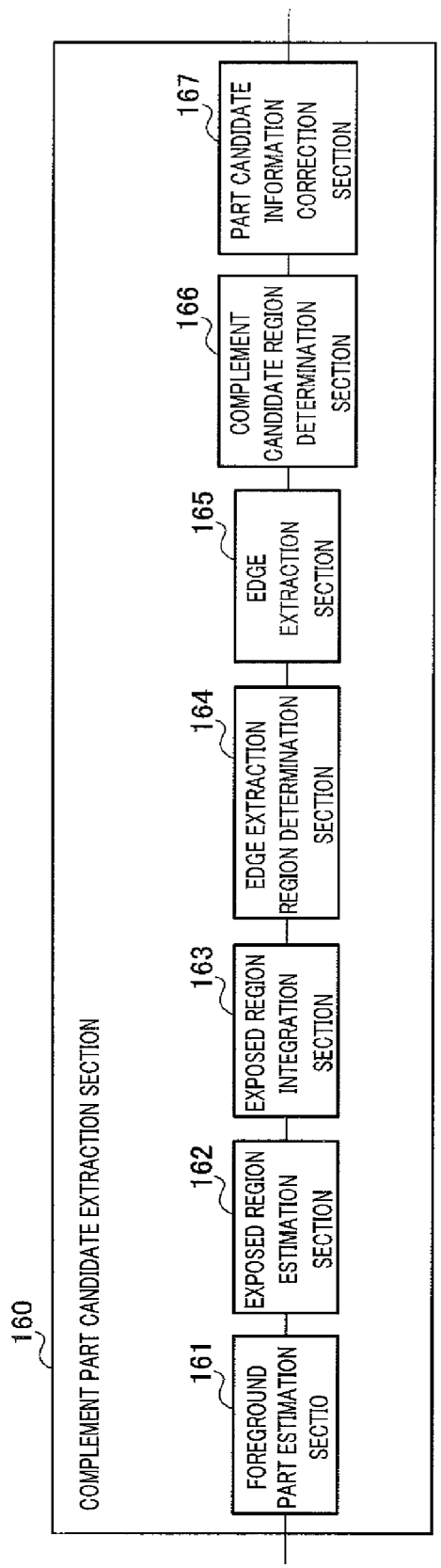
FIG. 3 is a block diagram showing a configuration example of a complement part candidate extraction section according to the present embodiments.

FIG. 3 is a block diagram showing a configuration example of complement part candidate extraction section 160.

As shown in FIG. 3, complement part candidate extraction section 160 includes foreground part estimation section 161, exposed region estimation section 162, exposed region integration section 163, edge extraction region determination section 164, edge extraction section 165, complement candidate region determination section 166, and part candidate information correction section 167. It is assumed that each section of complement part candidate extraction section 160 is capable of obtaining the image data, the part candidate information, the extracted part identifiers, the unextracted part identifiers, and the body constraint information.

Based on the received extracted part identifiers and unextracted part identifiers, foreground part estimation section 161 estimates the foreground part for each unextracted part. The term "foreground part" in this context refers to an extracted part that might be overlapping with, and partially occluding, an unextracted part on the screen. Specifically, foreground part estimation section 161 estimates the part axis of each extracted part, and identifies as being a foreground part an extracted part whose part axis overlaps with the range of motion of an unextracted part. Foreground part estimation section 161 outputs the part axis of each extracted part to exposed region estimation section 162, and maps respective foreground parts to the unextracted part identifiers of the unextracted parts and outputs them to exposed region estimation section 162 as such.

For each unextracted part and each foreground part, exposed region estimation section 162 estimates an exposed region thereof. The term "exposed region" in this context refers to a region where, when an unextracted part is partially occluded by a foreground part, that unextracted part might be exposed. Specifically, based on the part axis of a foreground part and the part thickness of that foreground part, exposed region estimation section 162 estimates the edges of the foreground part. Based on the edges of the foreground part and the part thickness of the unextracted part, exposed region estimation section 162 estimates a range for the edges of the unextracted part, and takes this range to be an exposed region. Exposed region estimation section 162 maps the estimated exposed region to the unextracted part identifier of the unextracted part and the foreground part identifier indicating the foreground part, and outputs it/them to the exposed region integration section 163 as such.

For each unextracted part, exposed region integration section 163 generates an exposed region that integrates the exposed regions of all foreground parts. Specifically, exposed region integration section 163 takes to be the integrated exposed region a region obtained by subtracting the part candidates of all extracted parts from the sum (logical sum) of the exposed regions of all foreground parts. Exposed region integration section 163 outputs the integrated exposed region to edge extraction region determination section 164.

For each unextracted part and based on the received exposed region and the range of motion of the unextracted part, edge extraction region determination section 164 determines an edge extraction region that is subject to edge extraction. Specifically, edge extraction region determination section 164 takes a region where the exposed region and range of motion of the unextracted part overlap (logical product) to be an edge extraction region. Edge extraction region determination section 164 outputs the determined edge extraction region to edge extraction section 165.

For each unextracted part, edge extraction section 165 performs edge extraction in the edge extraction region. Specifically, based on the body constraint information, edge extraction section 165 estimates an edge angle, and extracts from the edge extraction region in the image data a linear component having the estimated angle. Edge extraction section 165 extracts an edge from the extracted linear component, and outputs to complement candidate region determination section 166 the extracted edge and positional information indicating the side of the edge on which the unextracted part is located.

For each unextracted part and based on the received edge and positional information, complement candidate region determination section 166 determines a region, where it is estimated that the unextracted part is partially exposed, to be a complement candidate region. Specifically, complement candidate region determination section 166 computes as a complement candidate region a rectangular region, one of whose sides is the edge, having a width corresponding to the part thickness of the unextracted part towards the side indicated by the positional information. In other words, the complement candidate region is a region where the unextracted part is likely located with a portion thereof occluded by an extracted part. Complement candidate region determination section 166 maps the determined complement candidate region to the identification information of the unextracted part, and outputs it to part candidate information correction section 167.

For each unextracted part, part candidate information correction section 167 corrects the part candidate information (estimated likelihood map) in such a manner as to raise the likelihood that the unextracted part is located in the corresponding complement candidate region. Specifically, part candidate information correction section 167 increases, within the estimated likelihood map received from part candidate determination section 150, the likelihood value of the complement candidate region.

Based on the part candidate information received from part candidate extraction section 140, posture state estimation section 170 shown in FIG. 1 estimates the posture state of a person (hereinafter referred to as the "subject") in the image data. Specifically, for each posture state, posture state estimation section 170 is provided with, in advance, likelihood maps learned from a reference model in that posture state (hereinafter referred to as "learned likelihood maps"). If the estimated likelihood map and any of the learned likelihood maps match each other closely, posture state estimation section 170 estimates the posture state corresponding to the relevant learned likelihood map to be the posture state of the subject. Posture state estimation section 170 sends, by wire or wirelessly, information to information output apparatus 300 (e.g., a display apparatus), thus notifying the user of the estimation result. Posture state estimation section 170 may also estimate the orientation of the subject (e.g., whether the subject is seated facing right, seated facing left, and/or the like) in addition to its posture state.

Posture state estimation apparatus 100 may be a computer including a central processing unit (CPU), a storage medium (e.g., random-access memory (RAM)), and/or the like. In other words, posture state estimation apparatus 100 operates by having the CPU execute a stored control program.

When an unextracted part is partially occluded by an extracted part, posture state estimation apparatus 100 mentioned above is able to infer as much, and extract from the image data a part candidate for that unextracted part. Accordingly, even if the shape in the image is not elliptical, or even if one of two edges is not obtained, posture state estimation apparatus 100 is able to extract a part candidate for that part. Thus, posture state estimation apparatus 100 is able to estimate posture states with greater precision than the related art technique.

Operations of posture state estimation apparatus 100 will now be described.

Figure 4:
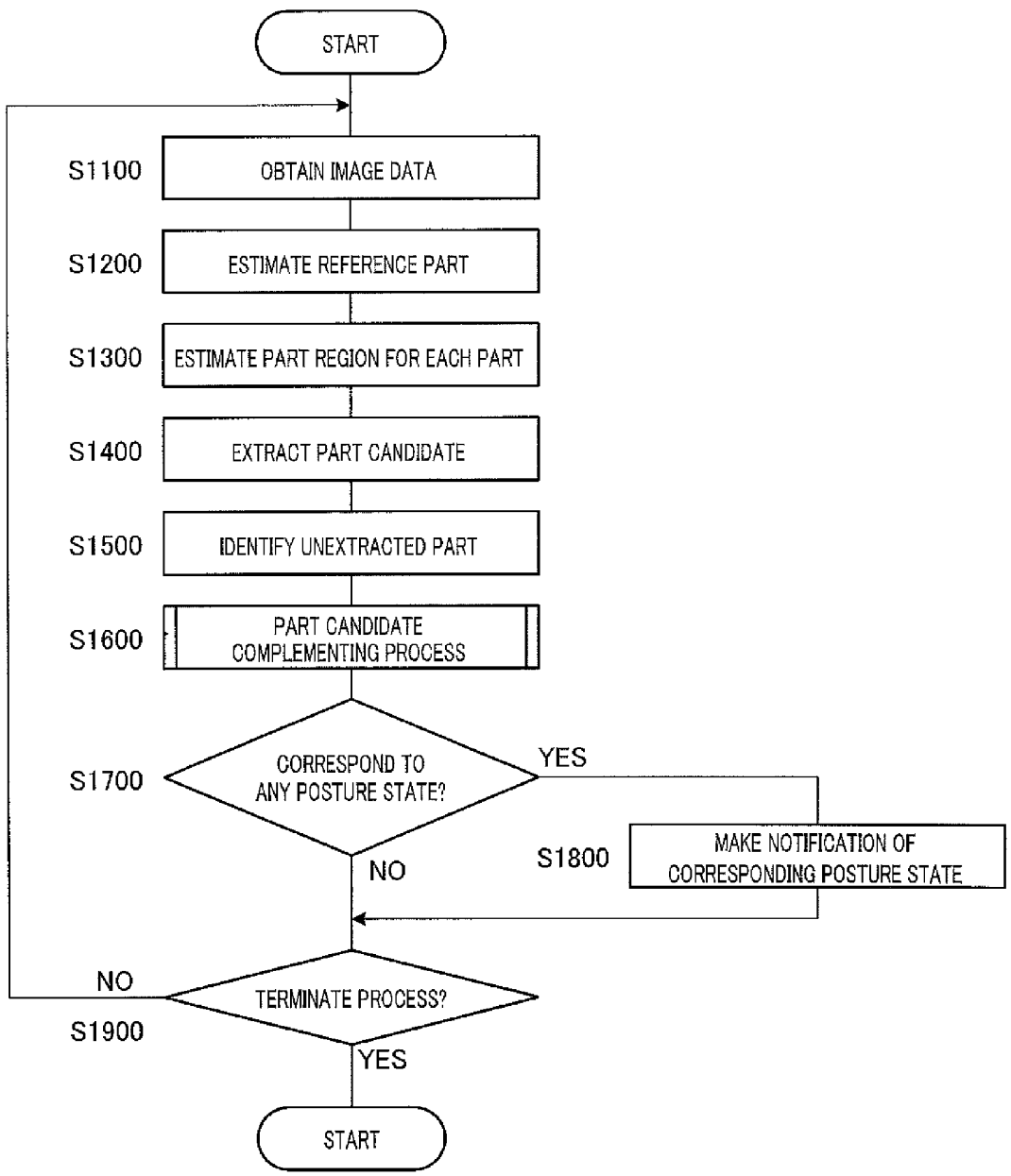
FIG. 4 is a flowchart showing an operation example of a posture state estimation apparatus according to the present embodiments.

FIG. 4 is a flowchart showing an operation example of posture state estimation apparatus 100.

First, in step S1100, part region estimation section 130 obtains one still image's worth of image data from monocular camera 200 via image data acquisition section 120.

In step S1200, part region estimation section 130 then performs a process of estimating the positions and orientation of reference parts (hereinafter referred to as "reference part estimation process").

An example of the details of the reference part estimation process will now be described. Broadly speaking, the reference part estimation process includes a first process of estimating the shoulder joint positions of a person, and a second process of estimating the orientation of the torso of a person.

The first process of estimating the shoulder joint positions of a person will be described first.

Part region estimation section 130 detects an omega shape from the image data, and estimates shoulder joint positions based on the omega shape.

Figure 5:
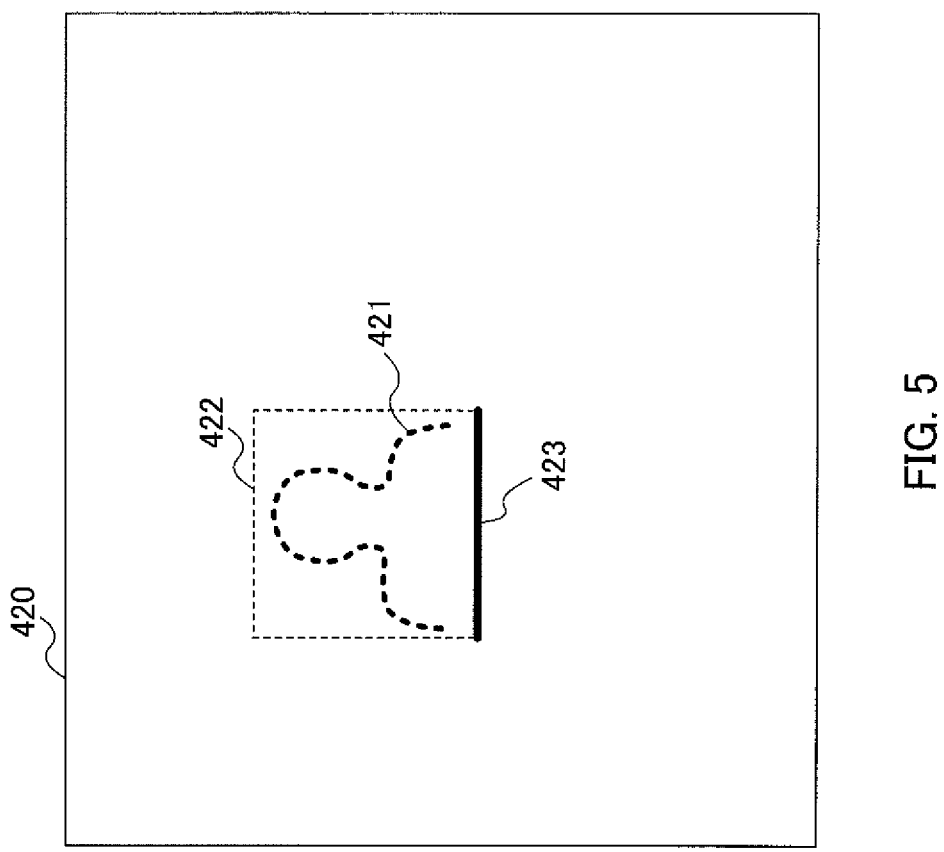
FIG. 5 is diagram illustrating an omega shape with respect to the present embodiments.

FIG. 5 is a diagram illustrating an omega shape.

An omega ($\Omega$) shape is a characteristic edge shape of a region that encompasses the head and shoulders of a person, and is a shape having a high probability that, with regard to the human body, imaging would be carried out most stably when a surveillance camera or the like is used. Further, the positions of the head and shoulders relative to the torso of a person vary little. Accordingly, part region estimation section 130 first detects an omega shape to detect the positions of the head and shoulders of a person. It then estimates part regions for other parts relative thereto, thus accurately estimating part regions.

An omega shape may be detected using a detector created with Real AdaBoost and/or the like using a sufficient number of sample images, for example. Examples of features used for the detector may include histogram of gradient (HoG) features, Sparse features, Haar features, and/or the like. Besides boosting algorithms, other learning algorithms such as support vector machines (SVMs), neural networks, and/or the like may also be employed.

Part region estimation section 130 first detects omega shape 421 from image 420 of the image data. Of the pixels in omega region 422, the pixels forming omega shape 421 (the pixels at the edge portion) are of a digital signal of "1," while the rest of the pixels are of a digital signal of "0." A relatively small rectangular region encompassing omega shape 421 is determined to be omega region 422. The base of omega region 422 is referred to as reference line 423.

Part region estimation section 130 eliminates noise contained in omega region 422. Specifically, of the pixels in omega region 422, part region estimation section 130 deems any digital signal of "1" that is present within the region enclosed by omega shape 421 to be noise and corrects it to a digital signal of "0." This correction may be done by performing a so-called closing process, for example. A closing process is a process that enlarges or reduces an image region by a predetermined number of pixels or by a predetermined proportion. Through this correction, the accuracy of the distance histogram discussed hereinafter may be improved.

Part region estimation section 130 obtains the perpendicular distance from reference line 423 to omega shape 421 at various positions along reference line 423.

Figure 6:
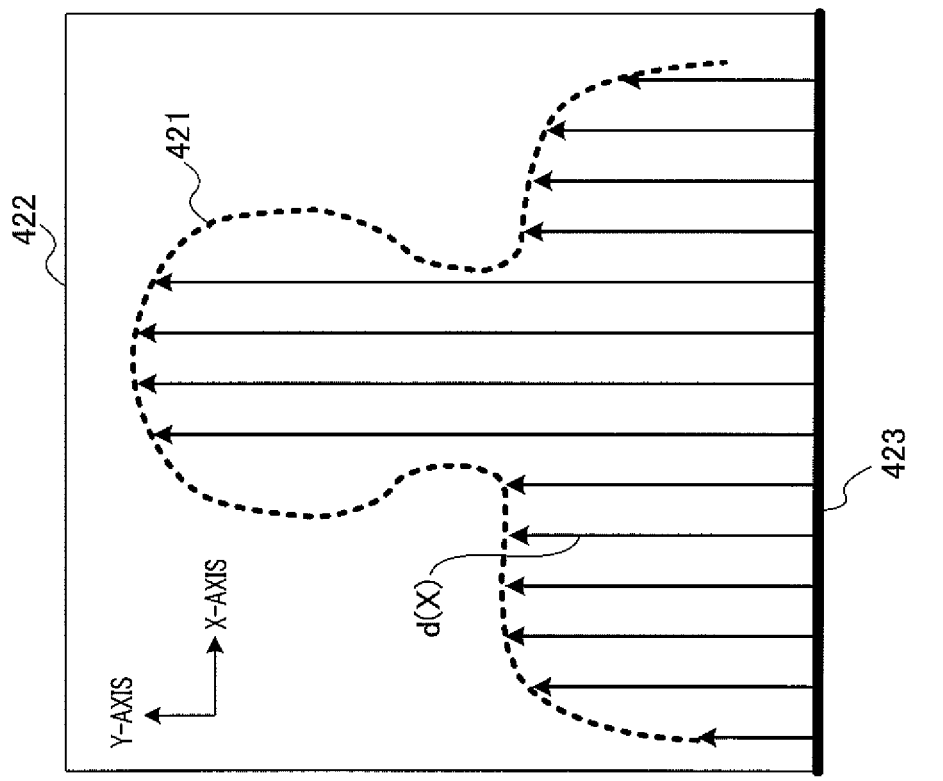
FIG. 6 is a diagram illustrating perpendicular distances from a reference line to an omega shape with respect to the present embodiments.

FIG. 6 is a diagram illustrating perpendicular distances from reference line 423 to omega shape 421.

As shown in FIG. 6, part region estimation section 130 treats the direction of reference line 423 as the X-axis, and the direction perpendicular to reference line 423 as the Y-axis. Part region estimation section 130 takes the pixel count from the left end of reference line 423 to be the X-coordinate, for example. Part region estimation section 130 acquires, as perpendicular distance d(X), the pixel count in the Y-axis direction from reference line 423 to the pixel forming omega shape 421, that is, the perpendicular distance to omega shape 421. By "the pixel forming omega shape 421," what is meant, for example, is the pixel closest to reference line 423 among pixels with a digital signal of "1."

Part region estimation section 130 generates a distance histogram where n items of perpendicular distance d(X) data are mapped to X-coordinates (where n is a positive integer).

Figure 7:
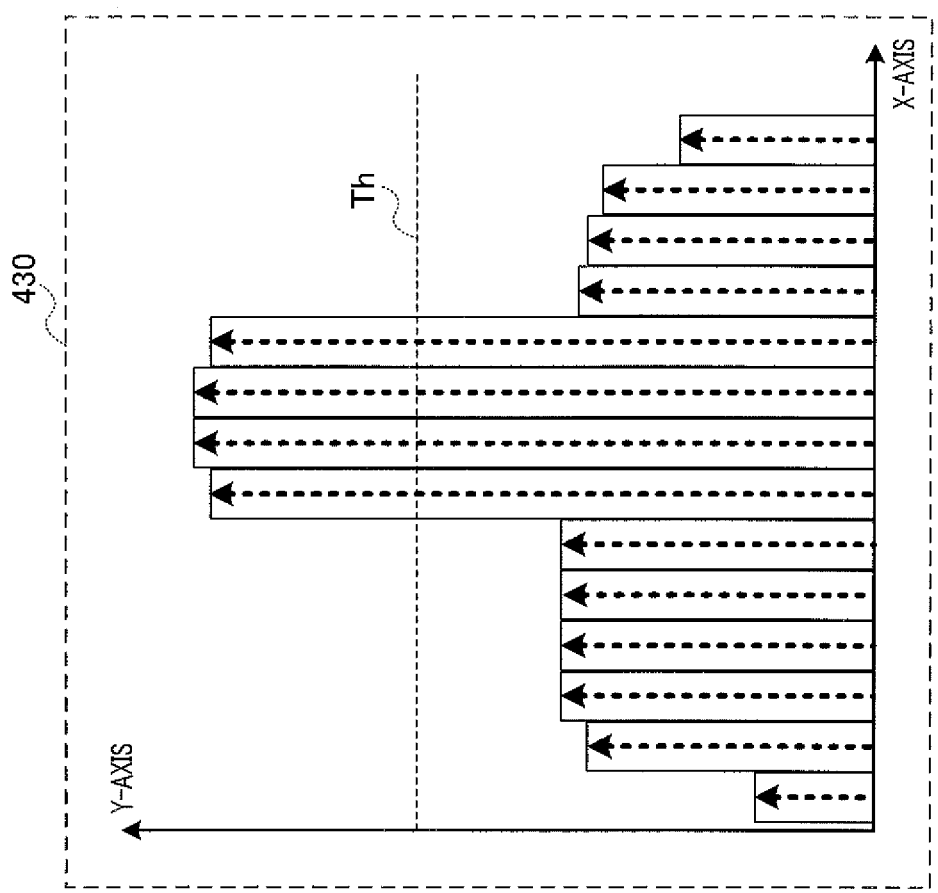
FIG. 7 is a diagram showing an example of a distance histogram with respect to the present embodiments.

FIG. 7 is a diagram showing an example of a distance histogram generated by part region estimation section 130 based on omega region 422 shown in FIG. 5.

As shown in FIG. 7, in an X-Y coordinate system where the Y-axis represents perpendicular distance d(X), part region estimation section 130 generates distance histogram 430 representing a distribution of perpendicular distance d(X). Distance histogram 430 is so shaped that it rises in a shape corresponding to the shoulders, and at some point protrudes over a range corresponding to the center portion of the head.

By applying predetermined threshold Th, part region estimation section 130 performs thresholding on distance histogram 430 thus generated. Specifically, part region estimation section 130 replaces the Y-coordinates at the X-coordinates where perpendicular distance d(X) is equal to or greater than threshold Th with "1," and the Y-coordinates at the X-coordinates where perpendicular distance d(X) is less than threshold Th with "0." The value of threshold Th is so set that, in omega region 422, it would likely be greater than perpendicular distance d(X) of the upper ends of the shoulders, but less than perpendicular distance d(X) of the upper end of the head. The thresholding process is by no means limited to that above, and other methods may also be employed, one example being what is known as Otsu's thresholding (Otsu's method).

Figure 8:
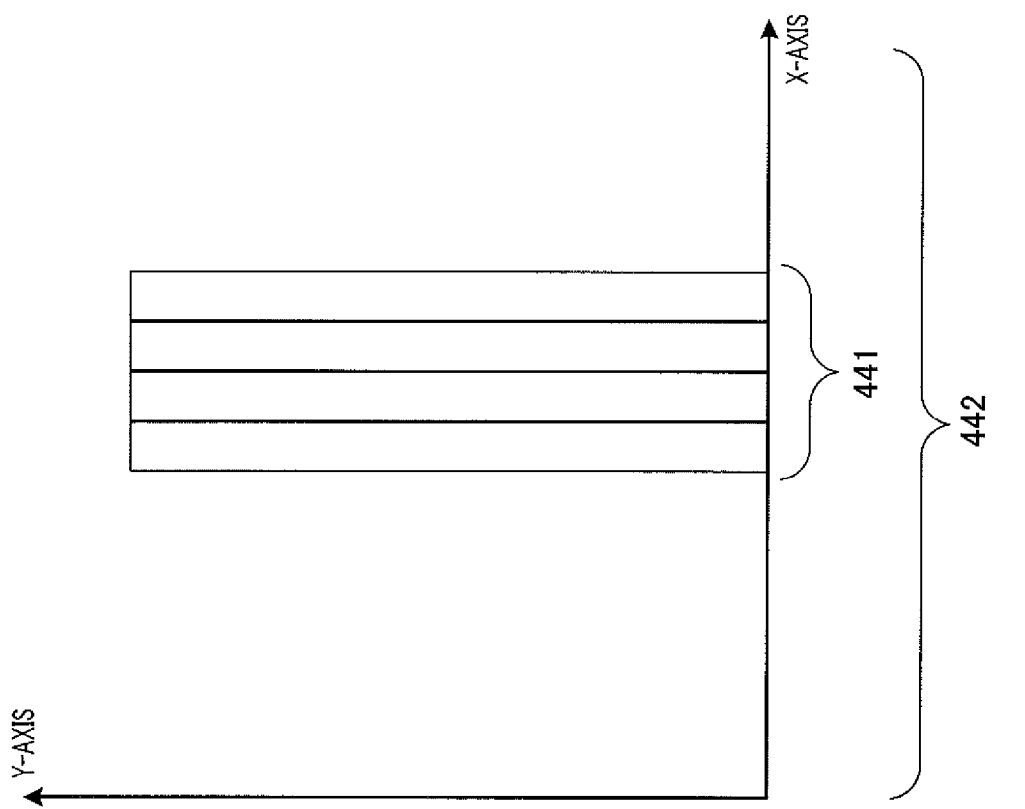
FIG. 8 is a diagram showing an example of a thresholded distance histogram with respect to the present embodiments.

FIG. 8 is an example of results obtained by thresholding distance histogram 430 shown in FIG. 7.

As shown in FIG. 8, range 441 of value "1" indicates the range of X-coordinates of the image region of the center portion of the head (hereinafter referred to as "head region"). Overall range 442 containing range 441 of value "1" indicates the range of X-coordinates of the image region of the shoulders (hereinafter referred to as "shoulder region"). Accordingly, from image 420 of the image data, part region estimation section 130 extracts the X-axis direction range of omega region 422 as the X-axis direction range of the shoulder region, and the X-axis direction range of range 441 of value "1" as the X-axis direction range of the head region.

Based on the extracted shoulder region and head region, part region estimation section 130 computes various parameters indicating the positions and orientations of the reference parts.

Figure 9:
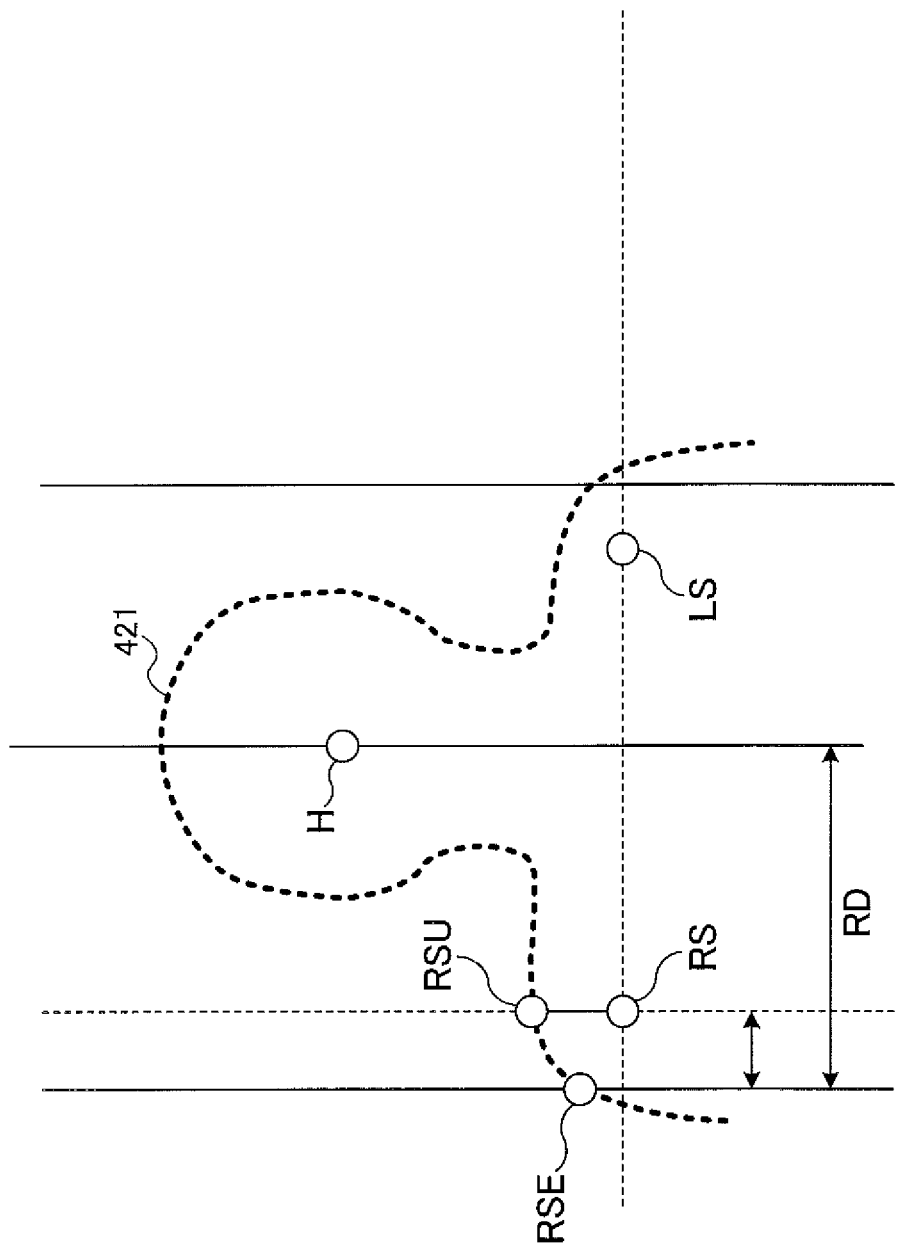
FIG. 9 is a diagram illustrating various parameters indicating reference parts with respect to the present embodiments.

FIG. 9 is a diagram illustrating various parameters representing the reference parts.

As shown in FIG. 9, it is assumed that part region estimation section 130 uses H(xh, yh), RSE(x_rse), RD(x_rd), RS(x_rs, y_rs), RSU(yr_su), and LS as symbols indicating the positions of the reference parts. The contents of the parentheses appended to the symbols indicate parameters for an X-Y coordinate system. H is the geometric center position of the head. RSE is the position of an end portion of the right shoulder. RD is the distance in the X-axis direction from the geometric center of the head to the end portion of the right shoulder. RS is the position of the right shoulder joint (hereinafter referred to as "right shoulder position"). RSU is the position of the apex of the right shoulder. LS is the position of the left shoulder joint (hereinafter referred to as "left shoulder position").

Part region estimation section 130 computes each parameter value as follows, for example.

First, based on whether or not (the torso of) the person is facing monocular camera 200, part region estimation section 130 determines the right shoulder region from among the shoulder region extracted based on the results of thresholding. Part region estimation section 130 determines whether or not the person is facing monocular camera 200 based on whether or not the skin colored components among the color information in the head region are at or above a predetermined threshold. For the case at hand, it is assumed that the person is facing monocular camera 200, and that the shoulder region on the left side of the image has been determined to be the right shoulder region.

Part region estimation section 130 next computes the geometric center position of the right shoulder region as right shoulder position RS(x_rs, y_rs). Part region estimation section 130 may also compute geometric center position H(xh, yh) of the head, and compute right shoulder position RS(x_rs, y_rs) using the distance between geometric center position H(xh, yh) and original omega shape 421 in the Y-axis direction (hereinafter referred to as "head height Δh"). Specifically, part region estimation section 130 may take a value, which is of a pre-defined ratio to head height Δh, as distance (xh−x_rs) from geometric center position H of the head to right shoulder position RS in the X-axis direction, for example. Part region estimation section 130 may also take a position that is lower than shoulder height by half the value of head height Δh, i.e., by Δh/2, to be the Y-coordinate of right shoulder position RS, i.e., y_rs, for example.

Furthermore, part region estimation section 130 computes, as position RSE(x_rse) of the end portion of the right shoulder, a point at which the edge gradient of omega shape 421 (i.e., the rate of change of the distance histogram) exceeds a threshold. Part region estimation section 130 computes distance RD(x_rd) in the X-axis direction between geometric center position H of the head and position RSE of the end portion of the right shoulder.

Finally, part region estimation section 130 estimates right shoulder position RS to be located at a position that is 80% of distance RD from geometric center position H of the head in the X-axis direction. Specifically, part region estimation section 130 computes X-coordinate x_rs of right shoulder position RS as x_rs=x_rse+0.2×RD. Part region estimation section 130 computes, as position RSU(y_rsu) of the apex of the right shoulder, the point of intersection between a straight perpendicular line that passes through right shoulder position RS (a straight line parallel to the Y-axis) and the edge of omega shape 421. Part region estimation section 130 computes Y-coordinate y_rs of right shoulder position RS as y_rs=y_rsu−0.2×RD.

Part region estimation section 130 carries out similar computations with respect to left shoulder position LS as well.

The computation methods for the various parameters are by no means limited to the examples provided above. By way of example, part lengths, such as shoulder width (e.g., the distance between right shoulder position RS and left shoulder position LS), are sometimes stored in body constraint information storage section 110 as one form of body constraint information. In such cases, part region estimation section 130 may compute various parameters using that body constraint information.

The second process of estimating the orientation of the torso of a person will now be described.

For the present embodiment, it is assumed that part region estimation section 130 performs the second process by referencing a reference part correspondence table pre-stored in body constraint information storage section 110 as one form of body constraint information.

The reference part correspondence table is a table that maps combinations of geometric center position H of the head, right shoulder position RS, and left shoulder position LS to the respective body orientations that can be estimated from the positions indicated by these combinations. In other words, the reference part correspondence table is a table that defines relative positional relationships of various parts. The combination of geometric center position H of the head, right shoulder position RS, and left shoulder position LS is hereinafter referred to as the "positions of the reference parts." The body orientation estimated from the positions of the reference parts is hereinafter referred to as the "orientation of the reference parts." The term "reference parts" refers to the omega-shaped portion indicating the head and shoulders of a person as discussed above. Accordingly, the orientation of the reference parts is the orientation of the body (torso) of a person.

Part region estimation section 130 derives from the reference part correspondence table the orientation of the reference parts corresponding to the positions of the reference parts computed based on the image data.

It is preferable that the positions of the reference parts included in the stored reference part correspondence table, as well as the positions of the reference parts computed by part region estimation section 130 based on the image data be normalized values independent of the size of the person on the screen. Specifically, part region estimation section 130 derives the orientation of the reference parts using values normalized in such a manner that, with geometric center position H of the head as the origin, the distance between geometric center position H of the head and right shoulder position RS or left shoulder position LS would be 1, for example.

The reference part correspondence table may also include right shoulder position RS and left shoulder position LS. The reference part correspondence table may also include the angle formed between a line passing through geometric center position H of the head and right shoulder position RS or left shoulder position LS and a straight perpendicular line passing through geometric center position H of the head (hereinafter referred to as "head perpendicular line"). The reference part correspondence table may also include the distance between geometric center position H of the head and left shoulder position LS relative to the distance between geometric center position H of the head and right shoulder position RS, where the latter distance is defined as being 1. Part region estimation section 130 derives the orientation of the reference parts by computing parameters corresponding to the parameters included in the reference part correspondence table.

FIG. 10 is a diagram showing example contents of a reference part correspondence table.

As shown in FIG. 10, reference part correspondence table 450 includes projection angle 452, coordinates 453 of left shoulder position LS, coordinates 454 of geometric center position H of the head, and reference part orientation 455, which are mapped to identifier 451. The various coordinates are expressed using a predetermined two-dimensional coordinate system parallel to the two-dimensional coordinate system of the screen, where right shoulder position RS is taken to be the origin, for example. Projection angle 452 is the angle of this predetermined two-dimensional coordinate system relative to the X-Z plane of three-dimensional coordinate system 410 described in connection with FIG. 2 (i.e., installation angle θ shown in FIG. 2), for example. Reference part orientation 455 is expressed as rotation angles relative to the X-, Y-, and Z-axes of three-dimensional coordinate system 410 described in connection with FIG. 2, for example. Each coordinate may also be expressed using a coordinate system that takes some other length to be 1, such as a part length of the arms, one's height, etc.

Part region estimation section 130 thus estimates the positions and orientation of the reference parts using body constraint information. This concludes this description of a reference part estimation process.

Next, in step S1300 in FIG. 4, part region estimation section 130 performs a process of estimating a part region for each part (hereinafter referred to as "part region estimation process") based on the estimated positions and orientation of the reference parts.

Example details of the part region estimation process will now be described.

For the present embodiment, it is assumed that part region estimation section 130 performs the part region estimation process by referencing a part region correspondence table pre-stored in body constraint information storage section 110 as one form of body constraint information.

The part region correspondence table is a table that maps the positions and orientation of the reference parts to part regions of other parts.

Part region estimation section 130 derives from the part region correspondence table a part region corresponding to the positions and orientation of the reference parts estimated from the image data.

Part regions may be defined in terms of pixel positions in the image of the image data, for example. Accordingly, with respect to all pixels in the entire image of the image data, part region estimation section 130 determines which part's part region each pixel belongs to.

FIG. 11 is a diagram showing example contents of a part region correspondence table.

As shown in FIG. 11, part region correspondence table 460 includes projection angle 462, head-shoulder region (reference parts) position 463, head-shoulder region (reference parts) orientation 464, and region 465 of each part, which are mapped to identifier 461.

Each position and region is represented by values of a two-dimensional coordinate system for the image, for example. Projection angle 462 is the angle of this predetermined two-dimensional coordinate system relative to the X-Z plane of three-dimensional coordinate system 410 described in connection with FIG. 2 (i.e., installation angle θ shown in FIG. 2), for example. Head-shoulder region position 463 is right shoulder position RS, for example. Head-shoulder region orientation 464 is expressed as rotation angles relative to the X-, Y-, and Z-axes of three-dimensional coordinate system 410 described in connection with FIG. 2, for example. Region 465 of each part is expressed in terms of the center coordinates and radius of a circle, assuming that the region can be approximated by a circle, for example. The radius is the part length.

If identifier 461 is the same as identifier 451 in reference part correspondence table 450, head-shoulder region orientation 464 does not necessarily have to be included in part region correspondence table 460.

In estimating part regions, other types of body constraint information may also be used. Furthermore, body constraint information may adopt configurations other than those discussed above.

Other body constraint information that may be used for part region estimation will now be described.

By way of example, with at least one of the length of a predetermined part and the angle of a joint as a reference, body constraint information limits the region in which a part that articulates with the predetermined part may lie (i.e., the part region). In this case, the body constraint information includes at least one of a ratio of a given part's length to another part's length and the angle range of motion of a joint, for example. The body constraint information may specify that, where the shoulder width is defined as being 1, the length of the upper arm is 0.6, for example.

By way of example, the body constraint information includes information that describes, for each part and, a part length ratio and freedom of movement in three directions (X-axis direction, Y-axis direction, and Z-axis direction) where the joint closer to the torso is taken to be the pivot point.

For the body constraint information, assuming, for example, that the part ID for the right upper arm is "3" and that the ratio of the part length of the right upper arm to the part length of the shoulders is "0.8," the part length of the right upper arm may be specified by a file or program source written as follows.

```
Begin
    Part ID: 3
        Length ratio: 0.8
End
```

For the body constraint information, assuming, for example, that the part ID for the right upper arm is "3" and that the ratio of the thickness of the right upper arm to the part length of the shoulders is "0.2," the part thickness of the right upper arm may be specified by a file or program source written as follows.

```
Begin
    Part ID: 3
        Thickness ratio: 0.2
End
```

Furthermore, it is assumed, for example, that the joint ID for the right shoulder is "100," that the part ID for the shoulders is "1," and that the part ID for the right upper arm is "3." It is also assumed that the movable directions of the right upper arm are (−60.0, 90.0) with respect to the X-axis, (−90.0, 90.0) with respect to the Y-axis, and (−90.0, 90.0) with respect to the Z-axis. In this case, the body constraint information may specify the freedom of the right upper arm with respect to the right shoulder joint by a file or program source written as follows, for example.

```
Begin
    Joint ID: 100
        Part ID: 1
        Part ID: 3
        Movable directions: rx, ry, rz
        Angles: (−60.0, 90.0), (−90.0, 90.0), (−90.0, 90.0)
End
```

For the cases above, the information indicating the articular relationship between joints and parts represented by joint IDs and part IDs, and the information indicating the movable directions and angles of each joint may be written in separate files.

The body constraint information may also be written in twills of information obtained by projecting each position onto a two-dimensional coordinate system. In this case, even if the positional information is unique three-dimensionally, its value may vary depending on the projection angle. Furthermore, movable directions and angles would be two-dimensional values. Accordingly, if body constraint information storage section 110 is to hold such values as body constraint information, then it must also hold information regarding projection angle.

This concludes this description of examples of other body constraint information used for part region estimation.

Upon completion of part region estimation, part region estimation section 130 outputs as part region data to part candidate extraction section 140, with respect to all pixels of the entire image of the image data, information indicating whether or not each pixel is a part region for a part.

The part region data may have a structure where there is laid out, for example, pixel information Kij indicating, with respect to all pixel positions (i, j) in the image data, whether or not there is a corresponding part region of a part. Each element in pixel information Kij may, for example, assume a value of "1" if it belongs to a part region of a corresponding part, or "0" if not. For pixel information Kij, there are as many dimensions as there are parts, for example, as in Kij=[k1, k2]. In this case, k1 may correspond to the part region of the right upper arm, and k2 to the part region of the right forearm.

By way of example, if part region estimation section 130 determines that some pixel position Kab is included in the part region of the right upper arm but not in the part region of the right forearm, pixel information Kab=[1, 0] is generated. Part region estimation section 130 generates as part region data the thus generated set of pixel information for each pixel.

How part regions are to be represented by part region data is by no means limited to the example provided above. By way of example, part region data may indicate, for each part region pre-defined in the image, which part's part region it corresponds to, or it may indicate, for each part, the coordinates of the perimeter of the part region.

If normalized reference part positions are to be used in the reference part estimation process, it is preferable that the part region correspondence table include a part region corresponding to the normalized reference parts. As in the case of the reference part correspondence table discussed hereinabove, part region data may also include other information such as right shoulder position RS, left shoulder position LS, and/or the like. Part region estimation section 130 derives the part region of each part by computing parameters corresponding to the parameters included in the part region correspondence table.

Figure 12:
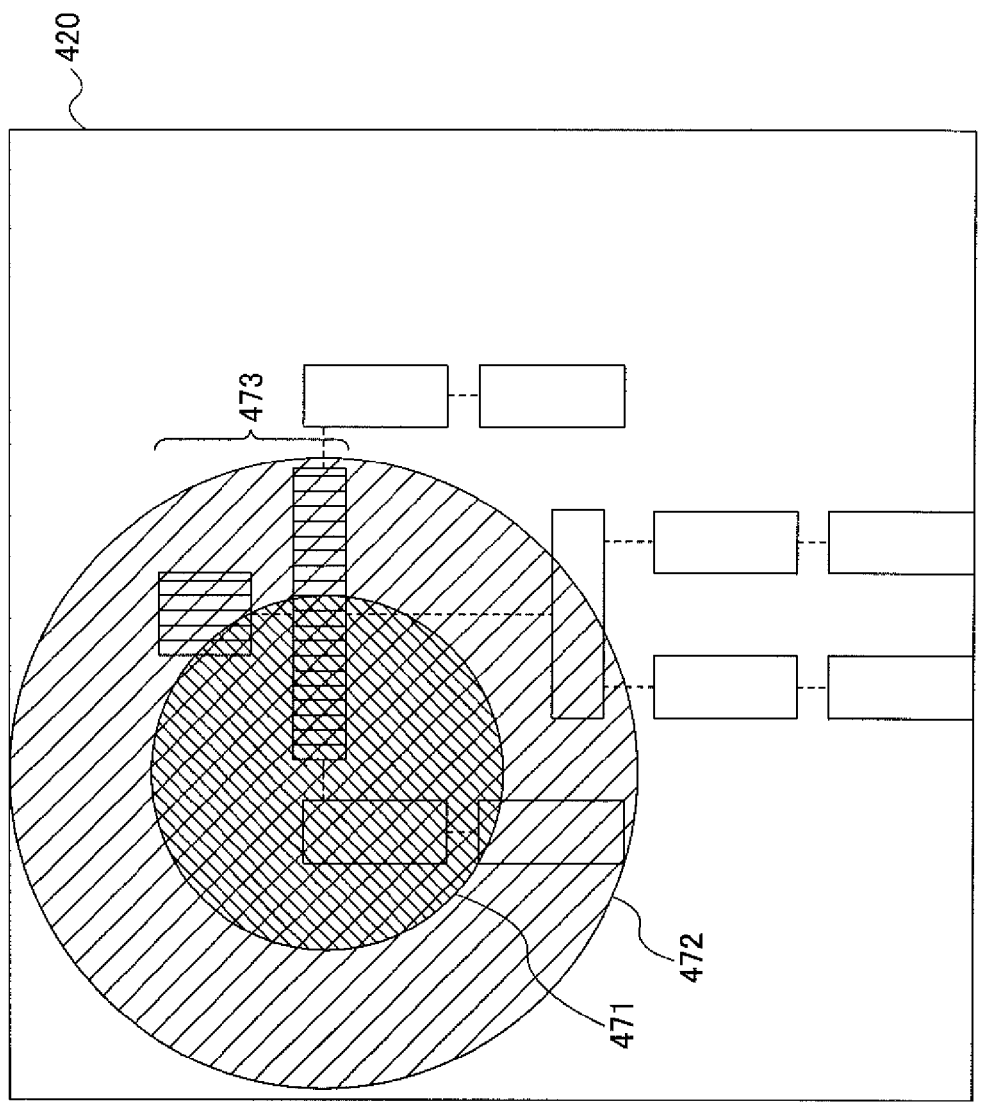
FIG. 12 is a diagram showing example contents of part region data with respect to the present embodiments.

FIG. 12 is a diagram showing example contents of part region data. For purposes of convenience, the position of each part with respect to a case of an upright standing state is also shown in the drawing.

As shown in FIG. 12, the part region data indicates, with respect to image 420 of the image data, part region 471 of the right upper arm, and part region 472 of the right forearm. These part regions 471 and 472 are estimated with reference to the already estimated positions and orientation of reference parts 473 as mentioned above.

Part region estimation section 130 thus estimates the part region of each part using body constraint information. This concludes this description of a part region estimation process.

Next, in step S1400 in FIG. 4, part candidate extraction section 140 a extract part candidate with respect to the part region of each part, and generates part candidate information indicating the extracted part candidates.

A first example of the details of a process of generating an estimated likelihood map as part candidate information (hereinafter referred to as "estimated likelihood map generation process") will now be described.

Part candidate extraction section 140 first identifies, from the image data and for each pixel within the part region of each part, image features suited for representing the position and orientation states of the part, and computes a likelihood value indicating the likelihood that the part is located thereat. Part candidate extraction section 140 then generates an estimated likelihood map indicating a distribution of likelihood values for the pixels using the likelihood values computed from the image data. The likelihood values may be values normalized to fall within the range of 0 to 1, as well as real numbers including positive integers and negative numbers.

For the method of recognizing an object of interest within the image, one may employ a technique where a face is recognized as an object of interest within the image using a strong classifier that combines a plurality of weak classifiers, for example. This technique creates strong classifiers by combining the sums of a plurality of weak classifiers based on rectangular information through AdaBoost, combines the strong classifiers in a cascade, and recognizes an object of interest within the image. For the image features, scale-invariant feature transform (SIFT) features may be employed (e.g., see NPL 1 and NPL 2), for example. SIFT features are configured with 128-dimensional vectors, and are values that are computed for each pixel. Because SIFT features are unaffected by scale changes, rotation, or translation of the object to be detected, they are particularly effective for detecting parts that are rotatable in various directions, e.g., the arms. In other words, SIFT features are suited for the present embodiment which defines posture states through the relative joint positions and angles of two or more parts.

When a method using SIFT features is applied to the present embodiment, strong classifiers Hk (where k=1, 2) are generated for each part region in advance through machine learning, and stored in part candidate extraction section 140, as in right upper arm (k=1), right form (k=2), and so forth. Classifiers Hk are generated by an AdaBoost algorithm. In other words, in generating strong classifiers Hk, learning is repeated until it is made possible to determine, with the desired level of accuracy, whether or not a plurality of training images prepared in advance for each part are the right upper arm, and whether or not they are the right forearm. Strong classifiers Hk are generated by connecting a plurality of weak classifiers in a cascade.

Upon computing an image feature for each part and each pixel, part candidate extraction section 140 inputs the image features to strong classifiers Hk. Part candidate extraction section 140 then computes the sum of values obtained by multiplying the output of each weak classifier forming the strong classifiers Hk with reliability α pre-obtained for each weak classifier. Part candidate extraction section 140 then subtracts predetermined threshold Th from the computed sum to compute likelihood value ck for each part and each pixel. For the present case, c1 represents a likelihood value for the right upper arm, and c2 a likelihood value for the right forearm.

Part candidate extraction section 140 expresses likelihood values Cij of the respective pixels, where the likelihood values of the respective parts are combined, as Cij=[c1, c2]. Part candidate extraction section 140 then outputs to posture state estimation section 170 as an estimated likelihood map the likelihood values Cij of all the pixels in the entire image.

For each pixel, part candidate extraction section 140 determines whether or not the pixel is included in any part region. If it is included, a likelihood value is computed using the classifier for that part, and if not, the likelihood value for that part may be set to 0, In other words, part candidate extraction section 140 may compute the products of determinant (Kij) of pixel information outputted from part region estimation section 130 and determinant (Cij) of likelihood values of the respective pixels computed irrespective of the part regions, and take the results thereof to be the final estimated likelihood map.

Figure 13:
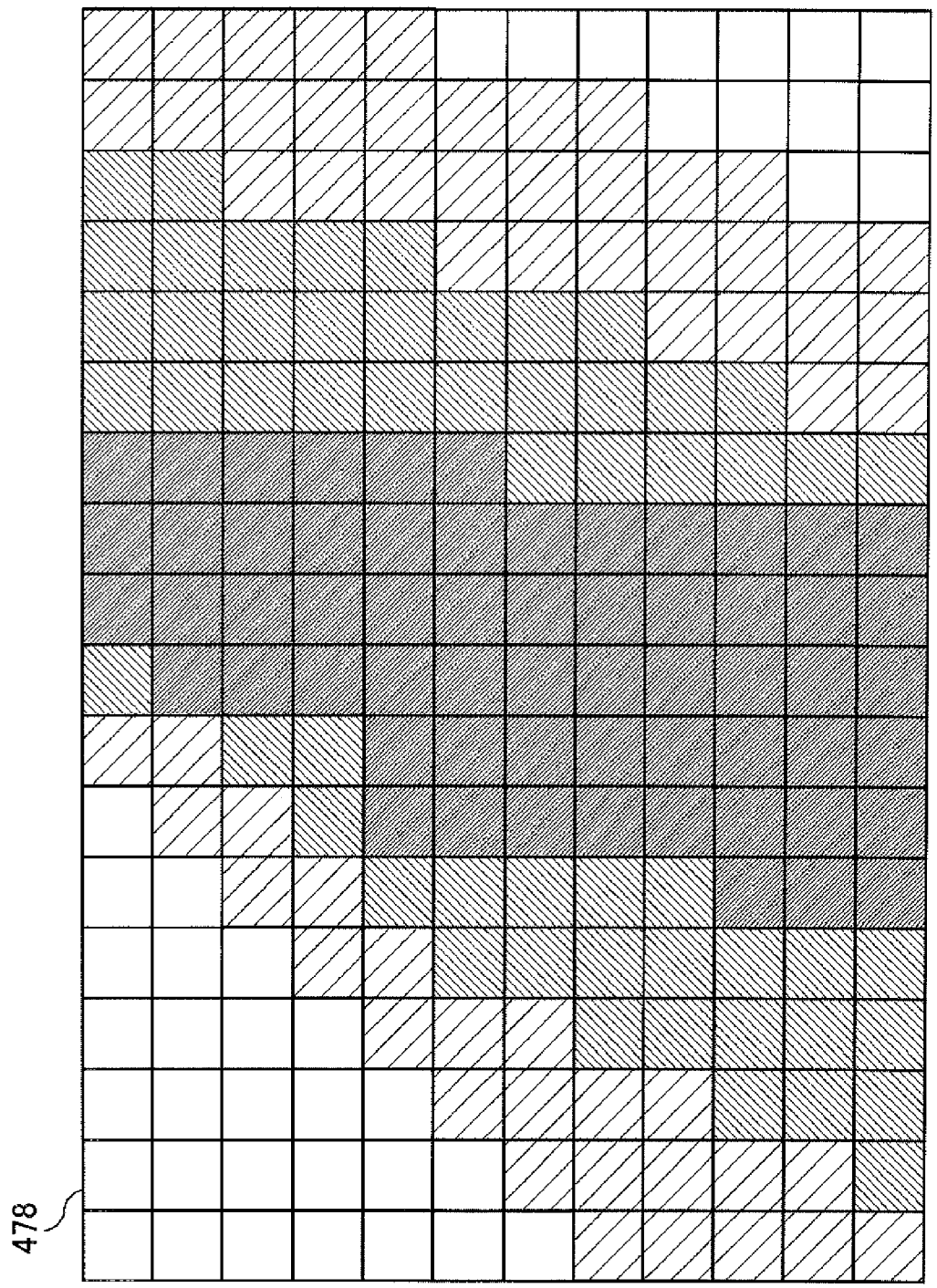
FIG. 13 is a diagram showing an example of an estimated likelihood map with respect to the present embodiments.

FIG. 13 is a diagram showing an example of an estimated likelihood map. Here, the likelihood values of just one part (e.g., the right upper arm) in an estimated likelihood map are shown, where pixels with higher likelihood values are shown with darker shadings. As shown in FIG. 13, estimated likelihood map 478 represents a distribution of likelihoods regarding part presence.

With respect to the information for each pixel in the likelihood map, for example, the likelihood value for part k is denoted by ck, where, if there are n parts, the data structure would be such that likelihood vector Cij=[c1, c2 . . . , ck . . . , cn].

Part candidate extraction section 140 thus generates an estimated likelihood map. This concludes this description of a first example of the details of an estimated likelihood map generation process.

A second example of the details of an estimated likelihood map generation process will now be described.

As in the technique disclosed in PL 1, for example, part candidate extraction section 140 generates an estimated likelihood map by extracting parallel lines from edges contained in the image data.

In this case, part candidate extraction section 140 extracts parallel lines by referencing a correspondence table that maps shoulder joint lengths to standard thickness values for various parts, the correspondence table being pre-stored in body constraint information storage section 110 as one form of body constraint information, for example. Part candidate extraction section 140 searches a part region for a pair of parallel lines spaced apart by a distance corresponding to the standard thickness for that part while rotating the direction of determination by 360°. Part candidate extraction section 140 repeats a process where, if there is a matching parallel line pair, a vote is cast for each pixel in the region enclosed by those parallel lines, and generates an estimated likelihood map based on the final number of votes for each pixel.

With such a method, the estimated likelihood map and the learned likelihood maps would include, for each pixel and each part, directions of parallel lines and numbers of votes (hereinafter referred to as "directional likelihood values"). By way of example, assuming that parallel line angles are divided into eight categories, the likelihood value of each pixel and each part would assume an eight-dimensional value corresponding to those eight directions. By way of example, further assuming that parallel line widths are divided into two categories, the likelihood value of each pixel and each part would assume a sixteen-dimensional (2×8=16) value. The parallel line distance or angle to be voted on may vary from part to part. By computing a plurality of parallel line widths and using the likelihood value of the width with the highest likelihood value, likelihood may be computed while absorbing differences in body type and clothing.

Part candidate extraction section 140 then determines, for each part, that the direction with the highest directional likelihood value is the main edge direction for that part, for example. In so doing, posture state estimation section 170 may compute the sum of likelihood values for all pixels for each direction, and determine the direction with the highest sum to be the direction with the highest directional likelihood value.

Part candidate extraction section 140 thus generates an estimated likelihood map using body constraint information. This concludes this description of a second example of the details of an estimated likelihood map generation process.

Next, in step S1500, part candidate determination section 150 identifies extracted parts and unextracted parts. Specifically, part candidate determination section 150 determines parts that meet a predetermined condition to be extracted parts, and parts that do not meet the predetermined condition to be unextracted parts. The predetermined condition may include, for example, in the case of an estimated likelihood map, whether or not the average of the values exceeds a predetermined threshold, or whether or not the number of pixels exceeding a predetermined threshold exceeds a predetermined threshold.

Figure 14:
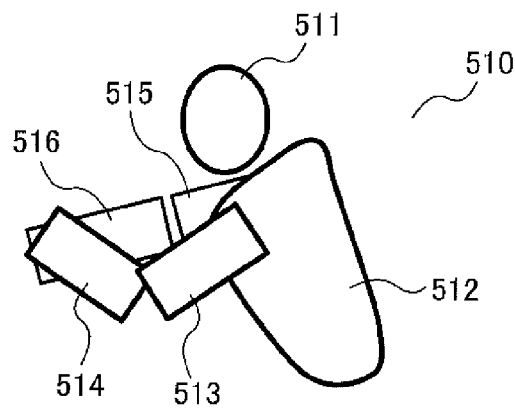
FIG. 14 is a diagram showing an example of a target image with respect to the present embodiments.

In the description below, it is assumed that there is inputted target image 510, such as that shown in FIG. 14, including a person's head 511, torso 512, left upper arm 513, and left forearm 514, as well as right upper arm 515 and right forearm 516, which are occluded by the left arm. It is further assumed that part candidate extraction section 140 extracts part candidates by extracting parallel lines as in the technique disclosed in PL 1.

Figure 15:
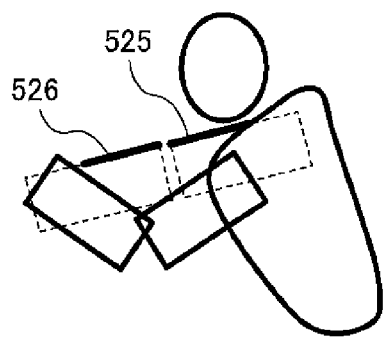
FIG. 15 is a diagram showing an example of an edge extraction result with respect to the present embodiments.
Figure 16:
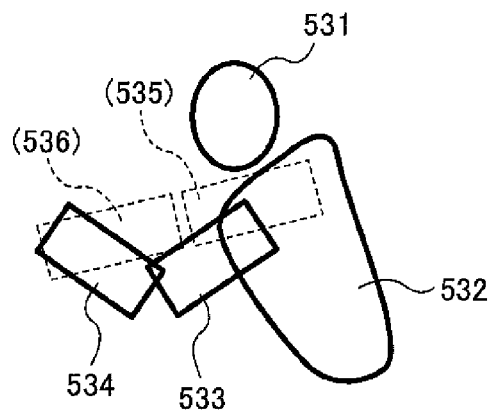
FIG. 16 is a diagram showing an example of a part candidate extraction result with respect to the present embodiments.

In this case, as shown in FIG. 15, only one edge each can be extracted from right upper arm 515 and right forearm 516, namely edges 525 and 526, respectively. Accordingly, as shown in FIG. 16, while part candidates 531-534 are extracted for head 511, torso 512, left upper arm 513, and left forearm 514, part candidates 535 and 536 will not be detected for right upper arm 515 and right forearm 516, respectively. Thus, part candidate determination section 150 will deem head 511, torso 512, left upper arm 513, and left forearm 514 to be extracted parts, and right upper arm 515 and right forearm 516 to be unextracted parts.

Then, in step S1600, complement part candidate extraction section 160 performs a process of complementing part candidate information (hereinafter referred to as "part candidate complementing process") by extracting part candidates for the unextracted parts.

Figure 17:
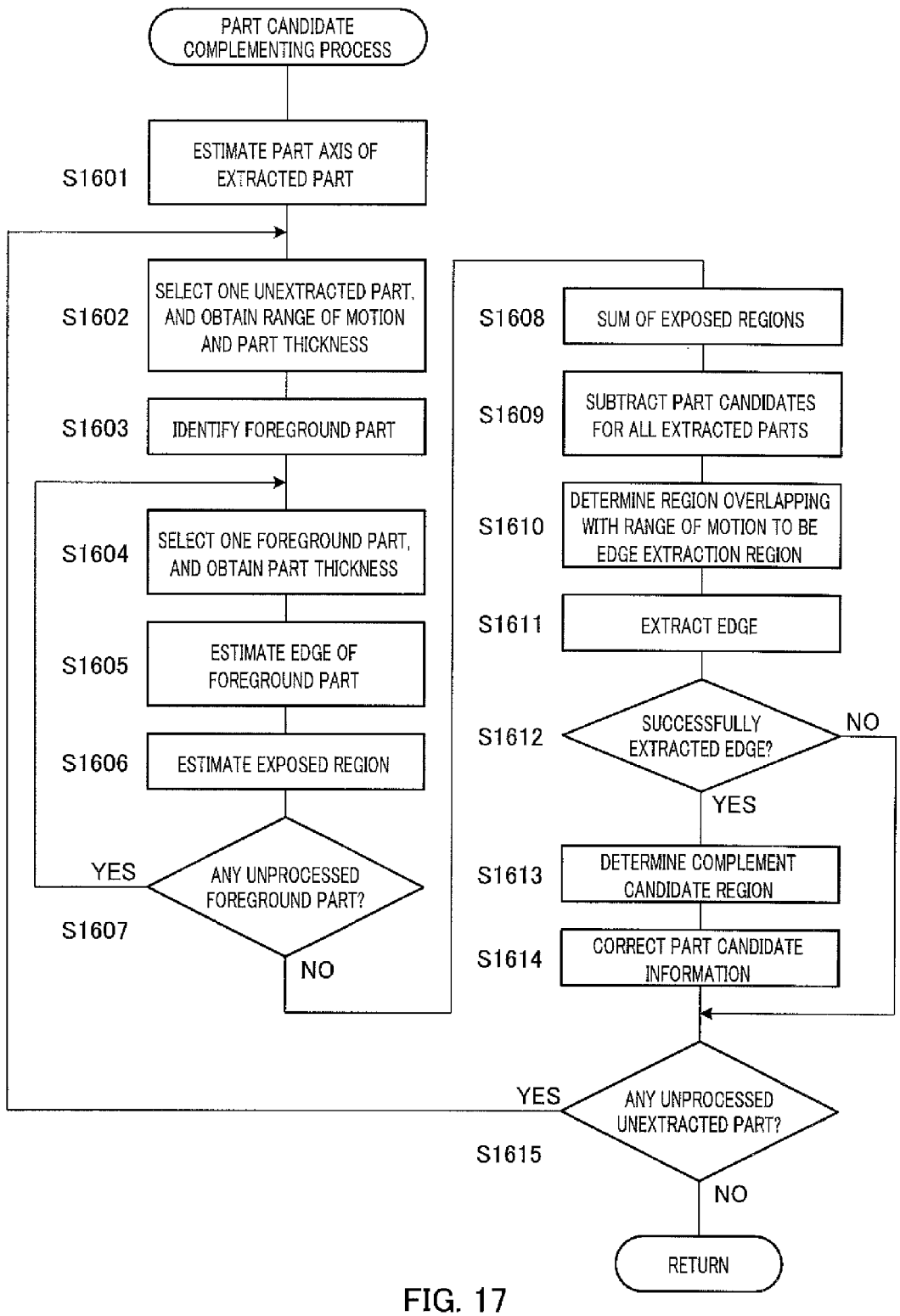
FIG. 17 is a flowchart showing an example of a part candidate complementing process with respect to the present embodiments.

FIG. 17 is a flowchart showing an example of a part candidate complementing process. FIGS. 18-23 are schematic diagrams showing how part candidate information is complemented through a part candidate complementing process. A part candidate complementing process will be described with reference to FIGS. 17-23.

First, in step S1601, foreground part estimation section 161 estimates a part axis for each extracted part. Specifically, if, for example, the outline of the part indicated by the part candidate for an extracted part can be approximated with an ellipse, foreground part estimation section 161 takes the long axis of that ellipse to be the part axis. Foreground part estimation section 161 may also approximate with an ellipse a region where the average value of the likelihood values for the pixels in that region exceeds a predetermined threshold, and take the long axis of that ellipse to be the part axis. If the part candidate contains directional components, foreground part estimation section 161 may also take the parallel component most frequently found in the part candidate to be the axial direction of the part, and take a straight line passing through the geometric center of a region containing pixels for which the likelihood values in the axial direction are equal to or greater than a predetermined threshold to be the part axis.

In step S1602, foreground part estimation section 161 then selects one unextracted part, and obtains the range of motion and part thickness of that unextracted part. The range of motion of an unextracted part may be estimated based on, for example, the joint positions indicated by the part axes of the extracted parts, and body constraint information indicating the range of motion of the unextracted part with respect to each joint. The part thickness of the unextracted part may be obtained from body constraint information, for example.

In step S1603, foreground part estimation section 161 then identifies an extracted part whose part axis overlaps with the range of motion of the currently selected unextracted part as being a foreground part.

Figure 18:
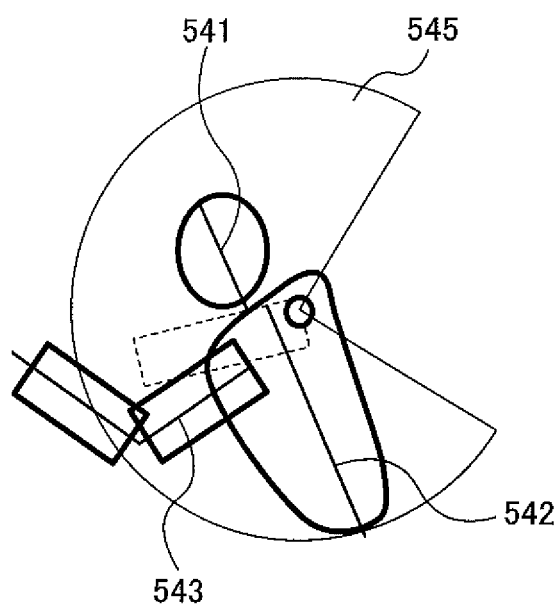
FIG. 18 is a diagram showing an example of the range of motion of an unextracted part with respect to the present embodiments.

Assuming that the right upper arm is selected from among the unextracted parts, range of motion 545 of the right upper arm encompasses part axes 541-543 of the head, the torso, and the left upper arm as shown in FIG. 18. Accordingly, foreground part estimation section 161 identifies the head, the torso, and the left upper arm as being foreground parts.

If the part candidate information is an estimated likelihood map, foreground part estimation section 161 may also identify extracted parts for which the number pixels exceeding a predetermined threshold within the range of motion of the unextracted part is equal to or greater than a predetermined threshold as being foreground parts. In this case, part axes may be extracted by the subsequent exposed region estimation section 162 instead of by foreground part estimation section 161.

In step S1604, exposed region estimation section 162 then selects one foreground part, and obtains its part thickness. The part thickness of the foreground part may be obtained from body constraint information, for example.

Figure 19:
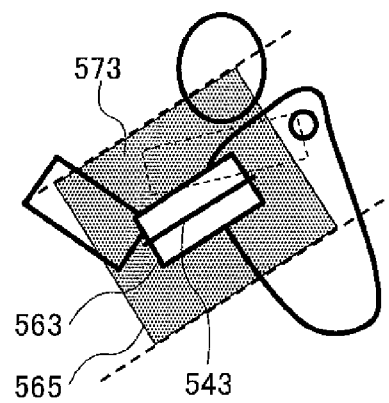
FIG. 19 is a diagram showing a first example of exposed region estimation with respect to the present embodiments.

In step S1605, exposed region estimation section 162 then estimates the edges of the currently selected extracted part based on the part axis and part thickness of the extracted part. Specifically, exposed region estimation section 162 takes, for example, rectangle 563 to be the edges of the extracted part as shown in FIG. 19, where rectangle 563 takes two line segments each located at a distance from the part axis equal to half the part thickness to be opposing sides thereof.

In step S1606, exposed region estimation section 162 then estimates an exposed region of the currently selected unextracted part associated with the currently selected extracted part based on the edges of the extracted part and the part thickness of the unextracted part. Specifically, exposed region estimation section 162 first extracts, for example, two line segments that are parallel to, and 1.2 times the length of, part axis 543 of the extracted part, and for which the edge of the extracted part (the distance from rectangle 563) is equal to the part thickness of the unextracted part. Exposed region estimation section 162 then obtains rectangle 565 which takes the two extracted line segments to be opposing sides thereof as shown in FIG. 19, and takes this rectangle 565 to be the maximum range for the edges of the unextracted part. Exposed region estimation section 162 takes the region between rectangle 563, which represents the edges of the extracted part, and rectangle 565, which represents the maximum range for the edges of the unextracted part, to be exposed region 573 of the currently selected unextracted part.

Exposed region estimation section 162 may also determine rectangle 565, which is the maximum range for the edges of the unextracted part, based on the part thickness or part axis length of the extracted part, as in 1.2 times the part thickness of the extracted part, for example. In this case, the part thickness of the unextracted part may be obtained by the subsequent complement candidate region determination section 166 instead of by foreground part estimation section 161.

In step S1607, exposed region estimation section 162 then determines whether or not there is a foreground part for which the exposed region estimation process has not yet been performed. If there is an unprocessed foreground part (S1607: YES), exposed region estimation section 162 returns to step S1604 and selects the next foreground part.

Figure 20:
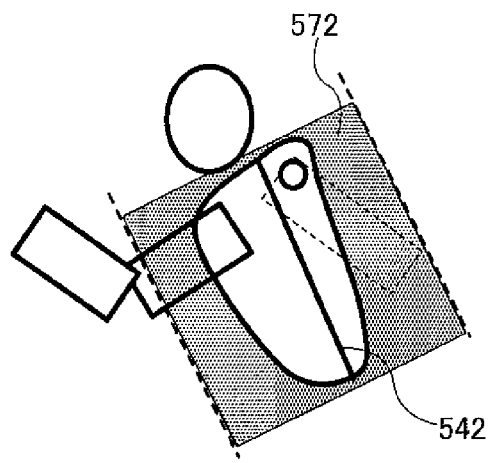
FIG. 20 is a diagram showing a second example of exposed region estimation with respect to the present embodiments.
Figure 21:
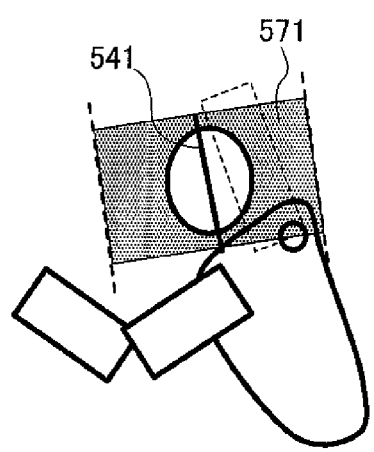
FIG. 21 is a diagram showing a third example of exposed region estimation with respect to the present embodiments.

By repeating the processes of steps S1604-S1607, exposed region estimation section 162 estimates exposed regions 571-573 corresponding to part axes 541-543 of the head, the torso, and the left upper arm, respectively, as shown in FIGS. 19-21.

Once there are no longer any unprocessed foreground parts (S1607: NO), exposed region estimation section 162 proceeds to step S1608.

In step S1608, exposed region integration section 163 computes the sum of all exposed regions estimated with respect to the currently selected unextracted part.

In step S1609, exposed region integration section 163 then takes a region obtained by subtracting part candidates for all extracted parts from the sum of exposed regions to be an integrated exposed region. Part candidates for the extracted parts may be defined as regions enclosed by edges derived from part thickness in the manner discussed above, or as regions whose values in the estimated likelihood map are equal to or greater than a predetermined threshold.

Figure 22:
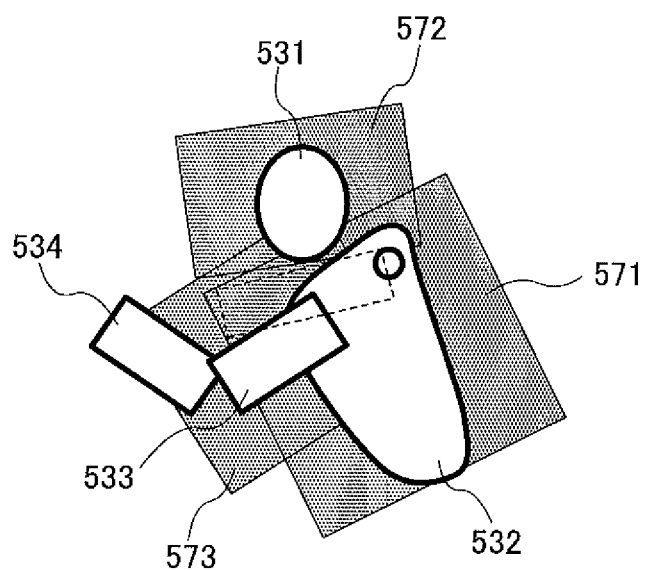
FIG. 22 is a diagram showing examples of integrated exposed regions with respect to the present embodiments.

For the cases shown in FIGS. 19-21, exposed region integration section 163 obtains a region by subtracting part candidates 531-534 for the head, the torso, the left upper arm, and the left forearm from the sum of exposed regions 571-573 of the head, the torso, and the left upper arm as shown in FIG. 22.

In step S1610, edge extraction region determination section 164 then determines the region where the integrated exposed region overlaps with range of motion 545 (see FIG. 18) of the currently selected unextracted part to be an edge extraction region.

In step S1611, edge extraction section 165 then estimates the angle of the edges of the currently selected unextracted part based on body constraint information, and extracts linear components of the estimated angle from the edge extraction region in the image data. Edge angles in this case may be defined as, for example, angles in 3-degree increments about the joint on the reference part side. Edge extraction section 165 then extracts edges from the extracted linear components, and determines which side of the edges the unextracted part is located on. Which side of the edges the unextracted part is located on may be determined based on which side of the edges the extracted part corresponding to the original exposed region is located on.

Assuming the right upper arm is selected in the example shown in FIG. 15, edge extraction selection 165 extracts upper edge 525 of the right upper arm, and determines that the right upper arm is located below edge 525.

In step S1612, complement candidate region determination section 166 then determines whether or not an edge has been extracted for the currently selected unextracted part. If an edge has been extracted (S1612: YES), complement candidate region determination section 166 proceeds to step S1613. If no edge has been extracted (S1612: NO), complement candidate region determination section 166 proceeds to S1615, which will hereinafter be described.

In step S1613, complement candidate region determination section 166 sets, on the side of the extracted edge on which the currently selected unextracted part is located, a rectangular region having the length of the part axis of, and a width equal to the part thickness of, the currently selected unextracted part. Complement candidate region determination section 166 then determines this rectangular region to be a complement candidate region.

Figure 23:
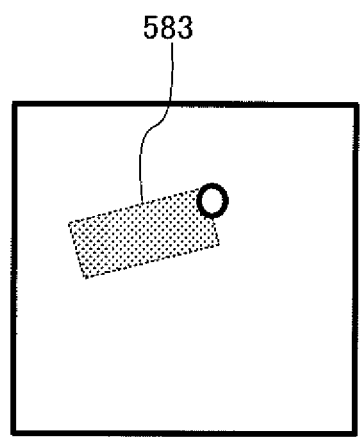
FIG. 23 is a diagram showing an example of an complement candidate region with respect to the present embodiments.

If the right upper arm is selected in the example shown in FIG. 15, complement candidate region determination section 166 determines a rectangular region, which takes upper edge 525 of the right upper arm to be its upper long side and the part thickness of the right upper arm to be its width, to be complement candidate region 583 as shown in FIG. 23.

Complement candidate regions are by no means limited to being rectangles, and may be of other shapes, e.g., ellipses, whose references are an edge of an unextracted part and the side of the edge on which they are located.

In step S1614, part candidate information correction section 167 then corrects the part candidate information in such a manner as to increase the likelihood that the currently selected unextracted part is located in the determined complement candidate region.

Here, part candidate information correction section 167 increases the values in the complement candidate region of the estimated likelihood map, thus weighting the complement candidate region. In other words, part candidate information correction section 167 corrects the estimated likelihood map in such a manner that the unextracted part would be more readily extracted in the complement candidate region.

In step S1615, foreground part estimation section 161 then determines whether or not there is an unextracted part for which the part candidate information correction process has not yet been performed. If there is an unprocessed extracted part (S1615: YES), foreground part estimation section 161 returns to step S1602 and selects the next unextracted part. If, on the other hand, there is no unprocessed unextracted part (S1615: NO), foreground part estimation section 161 returns to the process in FIG. 4.

By repeating the processes of steps S1601-S1615, complement part candidate extraction section 160 is able to extract part candidates for the right upper arm and the right forearm, and complement the part candidate information.

Next, in step S1700 in FIG. 4, posture state estimation section 170 determines, based on part candidate information that has been appropriately complemented, whether or not the posture state of the subject corresponds to any of the posture states that have been pre-set as determination targets.

Posture state estimation section 170 makes this determination based on whether or not any of the learned likelihood maps match the estimated likelihood map. In this case, posture state estimation section 170 performs a match level determination process in which, for example, it is determined whether or not a learned likelihood map and the estimated likelihood map match each other based on whether or not the level of match therebetween is of a predetermined level or greater.

An example of the details of a match level determination process will now be described. A first example of the details of a match level determination process corresponding to a case where the first example of the estimated likelihood map generation process discussed above is adopted will be described first.

Posture state estimation section 170 first performs thresholding on the estimated likelihood map and each learned likelihood map using their respective predetermined thresholds. Specifically, posture state estimation section 170 converts the likelihood value of each pixel and each part to a digital signal of "1" if it is equal to or greater than the predetermined threshold, or to a digital signal of "0" if it is less than the predetermined threshold.

Figure 24:
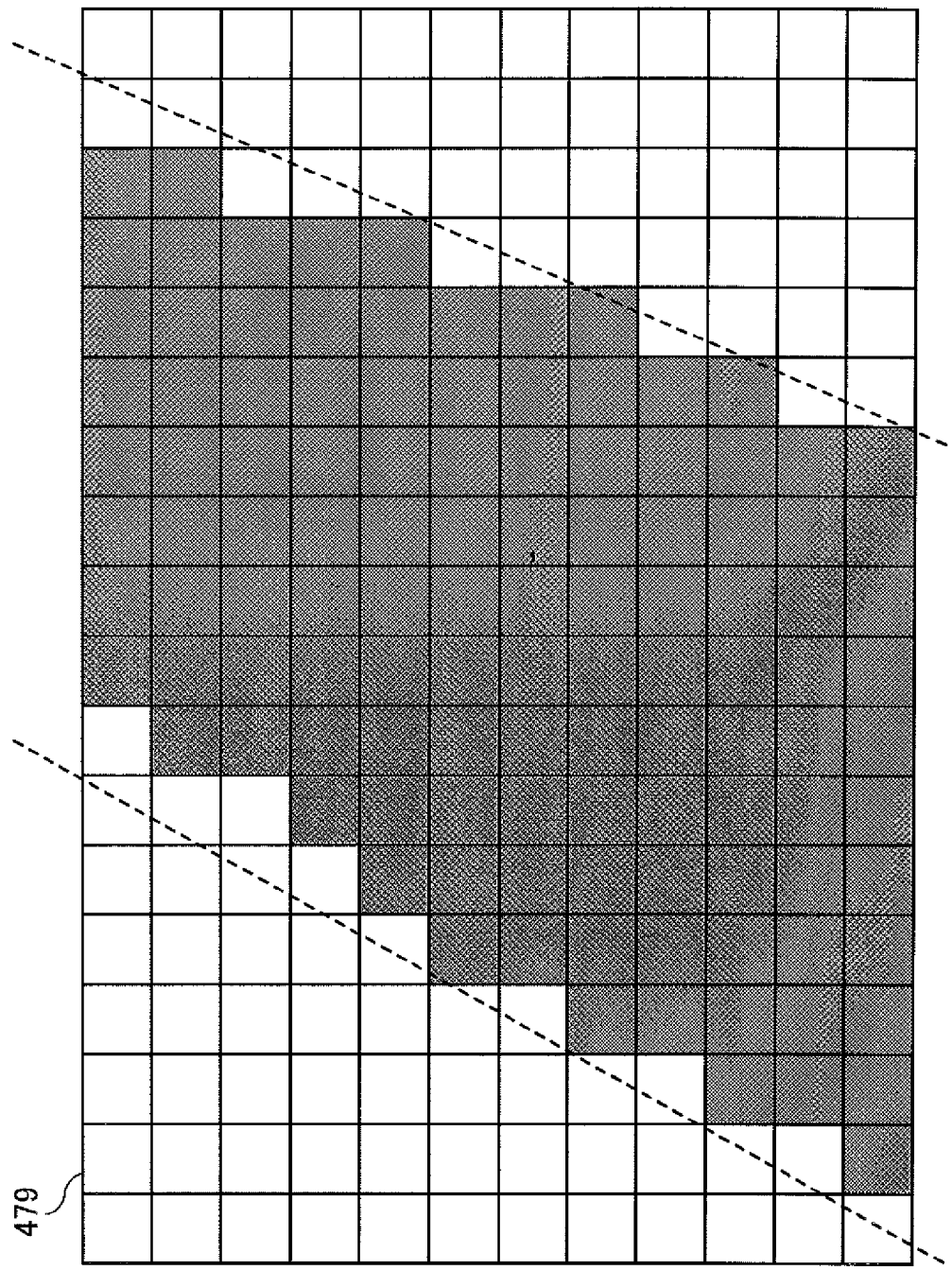
FIG. 24 is a diagram showing an example of an estimated likelihood map after thresholding with respect to the present embodiments.

FIG. 24 is a diagram showing an example of a post-thresholding state of the estimated likelihood map shown in FIG. 13. Here, pixels with a digital signal of "1" are shown in grey, and pixels with a digital signal of "0" in white. As shown in FIG. 24, thresholded estimated likelihood map 479 represents a distribution of portions where a part is likely located.

For each learned likelihood map, posture state estimation section 170 then computes the products of the thresholded likelihood values for each pixel and each part between the estimated likelihood map and the learned likelihood map, and takes the sum of the values for all pixels and all parts to be an evaluation value. Specifically, posture state estimation section 170 overlays the estimated likelihood map and the learned likelihood map on top of each other in a predetermined positional relationship, multiplies their thresholded likelihood value information with each other pixel by pixel, and computes the sum of the products for all pixels and parts.

Posture state estimation section 170 shifts the positional relationship for overlaying the estimated likelihood map and the learned likelihood map through translation and rotation, and performs the above-mentioned computation processes for each positional relationship. Posture state estimation section 170 then obtains the largest value among the computed evaluation values and takes it to be the final evaluation value representing the level of match with respect to the learned likelihood map. If there exists a learned likelihood map for which this evaluation value is equal to or greater than a predetermined threshold, posture state estimation section 170 determines that this learned likelihood map and the estimated likelihood map are a match. The threshold is pre-set to an appropriate value through learning, and/or the like.

Posture state estimation section 170 does not necessarily have to perform thresholding on the estimated likelihood map and the learned likelihood maps. In this case, posture state estimation section 170 would be able to determine with greater precision the levels of match between the learned likelihood maps and the estimated likelihood map. If thresholding is performed, however, posture state estimation section 170 would be able to determine the level of match quickly.

Posture state estimation section 170 thus determines the level of match between estimated likelihood maps and learned likelihood maps. This concludes this description of a first example of a match level determination process.

A second example of the details of a match level determination process corresponding to a case where the above-mentioned second example of an estimated likelihood map generation process is adopted will now be described.

For each part, posture state estimation section 170 overlays the estimated likelihood map and a learned likelihood map on top of each other in such a manner that key edge directions coincide therebetween, and computes the level of match. Subsequent processes are comparable to those in the above-mentioned first example.

A method that thus takes edge directions into account makes it possible to place constraints on the positional relationship for overlaying the estimated likelihood map and a learned likelihood map on top of each other, thereby enabling a reduction in processing load.

In computing the level of match between the estimated likelihood map and a learned likelihood map, posture state estimation section 170 may also use just the edge direction information. In this case, for example, posture state estimation section 170 takes the level of match with respect to angles formed between edge directions of a plurality of specified parts to be an evaluation value representing the level of match between the estimated likelihood map and a learned likelihood map. If the evaluation value falls within a predetermined range, posture state estimation section 170 then determines that the posture of the subject is in the posture state corresponding to the learned likelihood map in question. An edge direction of a part corresponds to its axial direction. Accordingly, such posture state estimation is comparable to estimating the direction of each part axis and the angle of each joint based on the image data, and evaluating, for the estimated part axis directions and joint angles, the levels of match with respect to reference models in various posture states.

A method that thus determines level of match using edge directions alone renders unnecessary the process of repeatedly computing a plurality of evaluation values while rotating the image, and is thus capable of further reducing the processing load. This concludes this description of a second example of a match level determination process.

If some learned likelihood map matches the estimated likelihood map (S1700: YES), posture state estimation section 170 proceeds to step S1800. If the learned likelihood maps do not match the estimated likelihood map (S1700: NO), posture state estimation section 170 proceeds to step S1900.

In step S1800, posture state estimation section 170 notifies the user, via information output apparatus 300, of the posture state corresponding to the learned likelihood map that matches the estimated likelihood map, and proceeds to step S1900.

In step S1900, part region estimation section 130 determines whether or not there has been an instruction, through user operation and/or the like, to terminate processing. If there has not been any instruction to terminate processing (S1900: NO), part region estimation section 130 returns to step S1100, and proceeds to process the next still image. If there has been an instruction to terminate processing (S1900: YES), part region estimation section 130 terminates the sequence of processing.

Through such an operation, when an unextracted part is partially occluded by an extracted part, posture state estimation apparatus 100 is able to infer as much, and extract a part candidate for that unextracted part from image data.

Thus, when an unextracted part is partially occluded by an extracted part, posture state estimation apparatus 100 according to the present embodiments infers as much and extracts a part candidate for that unextracted part from image data. Accordingly, when, for example, the right upper arm of a person facing left is partially occluded by the left upper arm located in front thereof, posture state estimation apparatus 100 is able to extract a part candidate for the right upper arm. Furthermore, posture state estimation apparatus 100 is able estimate the posture state using the part candidate for the right upper arm. In other words, posture state estimation apparatus 100 is capable of estimating, with greater precision as compared to the related art technique, the posture state of an object having joints, e.g., a human.

Furthermore, because posture state estimation apparatus 100 uses a likelihood map representing a distribution of likelihoods for each part, even if, for example, the right arm is covered by the outline of the torso in the image, it is possible to determine whether or not the posture state is "right arm is bent"

Furthermore, because posture state estimation apparatus 100 estimates a part region, which is a region within which a specified part is able to move, and sets low likelihood values for regions other than the part region, it is possible to improve the accuracy of the likelihood map.

Posture state estimation apparatus 100 may also be arranged to perform estimation only with respect to a given posture state that has been explicitly specified, and output an estimation result as to whether or not the specified posture state is assumed.

Furthermore, the image data used for object detection may also be data of images captured by a stereo camera or a plurality of cameras. When using image data of a stereo camera, posture state estimation apparatus 100 may use image data captured by one of the cameras and position information of the subject as derived from the installation parameters of the stereo camera. Furthermore, when using image data of a plurality of cameras, posture state estimation apparatus 100 may use image data captured by one of those cameras, and position information of the subject as derived from the installation parameters of each camera.

Furthermore, if the positions and orientation of the reference parts are known or specified, part region estimation section 130 need not perform the above-mentioned reference part estimation process. If, for example, the direction in which a person walks is fixed, and the orientation of the reference parts is generally uniform, part region estimation section 130 may hold body orientation information.

Furthermore, the part region estimation method performed by part region estimation section 130 is by no means limited to the examples provided above. By way of example, part region estimation section 130 may extract edge portions (hereinafter simply referred to as "edges") of an image from the image data, and estimate each part region based on the range of Y-coordinate values in the region enclosed by the edges. Specifically, for example, part region estimation section 130 may estimate, in the region enclosed by the edges, 20% of the region starting from the position where the Y-coordinate value is greatest to be a part region for the head. Similarly, for example, part region estimation section 130 may estimate the region from 15% to 65% to be a part region for the torso, the region from 55% to 85% to be a part region for the thighs, and the region from 75% to 100% to be a part region for the crura. In this case, values corresponding to the percentages of the various regions serve as body constraint information.

Furthermore, part region estimation section 130 may extract a moving body by computing background differences between images in the original video data, and take an entire region including the extracted region to be a part region candidate for each part. This expedites processing in estimating part regions.

Furthermore, posture state estimation apparatus 100 may estimate the part region of each part of interest by repeating a process where part positions are estimated one by one in order of increasing distance from the reference parts, and where the part region of the next part is estimated based on the estimated position.

Furthermore, posture state estimation apparatus 100 does not necessarily have to perform part region estimation. In this case, part candidate extraction section 140 would compute likelihood values uniformly for all regions in the image.

Furthermore, a learned likelihood map may sometimes be mapped to information regarding the optical axis direction of the image from which that learned likelihood map originated. In this case, posture state estimation section 170 may make comparisons using the learned likelihood map corresponding to installation angle θ of monocular camera 200.

Furthermore, if the subject is identifiable by a wireless tag and/or the like, posture state estimation apparatus 100 may hold body constraint information for each subject, and perform posture state estimation thus.

Furthermore, as in the technique disclosed in PL 1, posture state estimation apparatus 100 may also use regions indicating part candidates as part candidate information. In this case, complement part candidate extraction section 160 may move a rectangle of the same size as complement region 583 that has been determined (see FIG. 23) with respect to the map of extracted complement part candidates, for example. Complement part candidate extraction section 160 may then extract the position (e.g., three vertex coordinates of the rectangle) at which the sum of likelihood values of the pixels contained in that rectangle becomes greatest. Thus, the claimed invention may be applied to the posture state estimation method disclosed in PL 1.

Furthermore, the posture state estimation method performed by posture state estimation section 170 is by no means limited to the examples provided above. By way of example, posture state estimation section 170 may also perform posture state estimation using information regarding human reference models (hereinafter referred to as "reference model information"). For example, with respect to each state in an image representing a posture state as viewed from a given perspective (hereinafter referred to as "image posture state"), reference model information may include information indicating the joint angle and position of each joint in the image (e.g., the part length and range of motion of each part in the image). In other words, reference model information is constraint conditions regarding body types and postures of reference models.

One example of a posture state estimation method using reference model information is a method that uses a joint position of the subject, for example. In this case, information indicating, for each posture state, joint positions and/or the like as viewed from the perspective of the camera is taken to be the reference model information, for example. For example, posture state estimation section 170 searches the reference model information for a posture state that provides the closest match with the subject in terms of joint positions, thereby estimating the posture state.

The disclosure of the specification, drawings, and abstract included in Japanese Patent Application No. 2011-11860 filed on Jan. 24, 2011, is incorporated herein by reference in its entirety.

INDUSTRIAL APPLICABILITY

The claimed invention is useful for posture state estimation apparatuses and posture state estimation methods capable of accurately estimating the posture state of an object having joints.

REFERENCE SIGNS LIST

100 Posture state estimation apparatus
110 Body constraint information storage section
120 Image data acquisition section
130 Part region estimation section
140 Part candidate extraction section
150 Part candidate determination section
160 Complement part candidate extraction section
161 Foreground part estimation section
162 Exposed region estimation section
163 Exposed region integration section
164 Edge extraction region determination section
165 Edge extraction section
166 Complement candidate region determination section
167 Part candidate information correction section
170 Posture state estimation section
200 Monocular camera
300 Information output apparatus

The invention claimed is:

1. A posture state estimation apparatus that estimates a posture state of an object comprising a plurality of parts based on image data of the object, the posture state estimation apparatus comprising:
  a candidate extraction section that performs, for each of the parts, an extraction of the parts from the image data;
  an exposed region estimation section that determines an exposed region having an edge, the distance from an edge of a first candidate to the edge of the exposed region being determined from a thickness of a second candidate, the first candidate being for an extracted part of the parts, the second candidate being for an unextracted part of the parts;
  a complement candidate extraction section that determines a complement candidate region based on the exposed region and a constraint information regarding the parts, and performs an extraction of the second candidate from the image data within the bounds of the complement candidate region, the compliment candidate region being a region where the second candidate is likely located and a portion of which being likely occluded by the first candidate; and
  an estimation section that estimates the posture state of the object based on the first candidate and the second candidate.

2. The posture state estimation apparatus according to claim 1, wherein the constraint information comprises information that is determined based on at least a length of the part of the object.

3. The posture state estimation apparatus according to claim 2, wherein the information is determined based on the length of the part comprises a ratio of lengths of the plurality of parts.

4. The posture state estimation apparatus according to claim 1, wherein the complement candidate extraction section finds a part axis and a part thickness of the first candidate, finds an edge of the second candidate based on the part axis, the part thickness, and the constraint information, and determines the complement candidate region based on a positional relationship between the edge of the second candidate and the first candidate.

5. The posture state estimation apparatus according to claim 4, further comprising an edge extraction region determination section that determines an edge extraction region based on the part axis, the part thickness, and the range of motion of the second candidate derived based on the first candidate, wherein the complement candidate extraction section finds the part edge based on the edge extraction region and the constraint information.

6. The posture state estimation apparatus according to claim 5, wherein the complement candidate extraction section estimates an angle of an edge of the second candidate based on the constraint information, extracts a linear component having the estimated angle from the edge extraction region, and extracts the edge from the linear component.

7. The posture state estimation apparatus according to claim 1, wherein, if there are a plurality of the first candidate, the complement candidate extraction section subtracts all of the first candidates from the complement candidate region.

8. The posture state estimation apparatus according to claim 1, wherein the estimation section estimates the posture state of the object based on information corresponding to the direction of each part axis and estimated from the image data.

9. The posture state estimation apparatus according to claim 1, wherein the object comprises a human.

10. The posture state estimation apparatus according to claim 1, wherein the constraint information comprises information that is determined based on a part length of the object and an angle between adjacent parts.

11. The posture state estimation apparatus according to claim 1, wherein the constraint information comprises information that is determined based on a part length of the object and a part thickness of the object.

12. The posture state estimation apparatus according to claim 1, wherein the complement candidate extraction section performs an extraction of an edge of the second candidate within a region where the exposed region overlaps with range of motion of the second candidate, and set, as the complement candidate region, a region having a width equal to the thickness of second candidate on the side of the edge of the first candidate on which the edge of the second candidate is located.

13. A posture state estimation method that estimates a posture state of an object comprising a plurality of parts based on image data of the object, wherein:

performing, for each of the parts, an extraction of parts from the image data;

determining an exposed region having an edge, the distance from an edge of a first candidate to the edge of the exposed region being determined from a thickness of a second candidate, the first candidate being for an extracted part of the parts, the second candidate being for an unextracted part of the parts;

determining a complement candidate region based on the exposed region and a constraint information regarding the parts;

performing an extraction of the second candidate from the image data within the bounds of the complement candidate region, the compliment candidate region being a region where the second candidate is likely located and a portion of which being likely occluded by the first candidate; and estimating the posture state of the object based on the first candidate and the second candidate.

\* \* \* \* \*